United States Patent
Xiong et al.

(10) Patent No.: US 11,206,689 B2
(45) Date of Patent: Dec. 21, 2021

(54) METHOD AND DEVICE FOR PERFORMING A RANDOM ACCESS IN WIRELESS COMMUNICATION SYSTEM

(71) Applicant: Samsung Electronics Co., Ltd, Suwon-si (KR)

(72) Inventors: Qi Xiong, Beijing (CN); Bin Yu, Beijing (CN); Chen Qian, Beijing (CN); Jingxing Fu, Beijing (CN); Yi Wang, Beijing (CN); Yingjie Zhang, Beijing (CN)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 16/338,373

(22) PCT Filed: Sep. 29, 2017

(86) PCT No.: PCT/KR2017/010899
§ 371 (c)(1),
(2) Date: Mar. 29, 2019

(87) PCT Pub. No.: WO2018/062925
PCT Pub. Date: Apr. 5, 2018

(65) Prior Publication Data
US 2020/0029366 A1    Jan. 23, 2020

(30) Foreign Application Priority Data

Sep. 30, 2016   (CN) .......................... 201610875849.2

(51) Int. Cl.
*H04W 74/08*   (2009.01)
*H04L 1/16*    (2006.01)
*H04W 72/04*   (2009.01)

(52) U.S. Cl.
CPC ....... *H04W 74/0833* (2013.01); *H04L 1/1607* (2013.01); *H04W 72/04* (2013.01)

(58) Field of Classification Search
CPC .. H04W 74/0833; H04W 72/04; H04L 1/1607
(Continued)

(56) References Cited

U.S. PATENT DOCUMENTS

| 2009/0073944 A1 | 3/2009 | Jiang et al. |
| 2011/0075620 A1 | 3/2011 | Jang et al. |

(Continued)

FOREIGN PATENT DOCUMENTS

| KR | 20100069717 A | 6/2010 |
| KR | 20150115685 A | 10/2015 |

OTHER PUBLICATIONS

International Telecommunication Union, "IMT Traffic estimates beyond year 2020", Oct. 21, 2014, 35 pages.
(Continued)

*Primary Examiner* — Chi Tang P Cheng

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure relates to the technical filed of wireless communication, and particularly, to a method for random access. The method comprises the steps of transmitting a random access signal comprising a preamble sequence and a payload from a terminal to a base station, wherein the preamble sequence is configured randomly or according to size of the data to be transmitted and the payload is configured according to current service requirements; and receiving by the terminal feedback information transmitted back by the base station which corresponds to the random access signal, wherein the feedback information comprises at least (Continued)

one of unique user identification information, timing advance information, uplink transmission grant information, and acknowledgement (ACK) signal/negative acknowledgement (NACK) signal. The present solution may use two interactive steps to realize the function that is realized through four interactive steps in the prior art by designing the random access signal such that it comprises the preamble sequence and the payload, therefore it can reduce access delay in data transmission.

29 Claims, 10 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2013/0107851 | A1* | 5/2013 | Park | H04W 72/0413 370/329 |
| 2015/0085721 | A1* | 3/2015 | Meng | H04L 12/189 370/280 |
| 2015/0282213 | A1 | 10/2015 | Sun et al. | |
| 2015/0289292 | A1 | 10/2015 | Sun et al. | |
| 2016/0142237 | A1* | 5/2016 | Atungsiri | H04L 27/2627 375/260 |
| 2016/0286578 | A1 | 9/2016 | Bertrand et al. | |
| 2017/0048851 | A1* | 2/2017 | Yang | H04W 52/04 |
| 2018/0310329 | A1* | 10/2018 | Yang | H04L 1/1607 |

OTHER PUBLICATIONS

International Telecommunication Union, "Future technology trends of terrestrial IMT systems", Nov. 2014, 32 pages.
International Telecommunication Union, "IMT Vision—Framework and overall objectives of the future development of IMT for 2020 and beyond", Sep. 2015, 21 pages.
Li Ping, "Interleave-Division Multiple-Access", IEEE Transactions on Wireless Communications, vol. 5, No. 4, Apr. 2006, p. 938-947.
International Search Report dated Jan. 24, 2018 in connection with International Patent Application No. PCT/KR2017/010899, 2 pages.
Written Opinion of the International Searching Authority dated Jan. 24, 2018 in connection with International Patent Application No. PCT/KR2017/010899, 9 pages.
Korean Intellectual Property Office, "Notice of Preliminary Rejection" in connection with Korean Patent Application No. 10-2019-7011149, dated Aug. 13, 2021, 17 pages.
Ericsson, "On the random access procedure", 3GPP TSG-RAN WG1 #86, R1-167059, Gothenburg, Sweden, Aug. 22-26, 2016, 4 pages.

* cited by examiner

[Fig. 1]
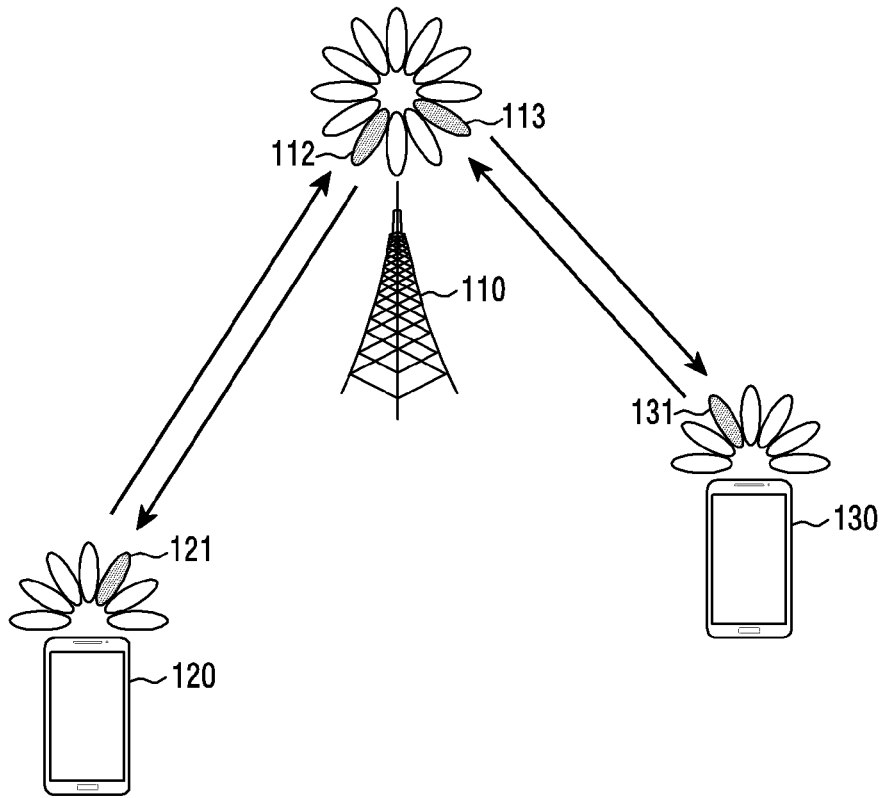
[Fig. 2]
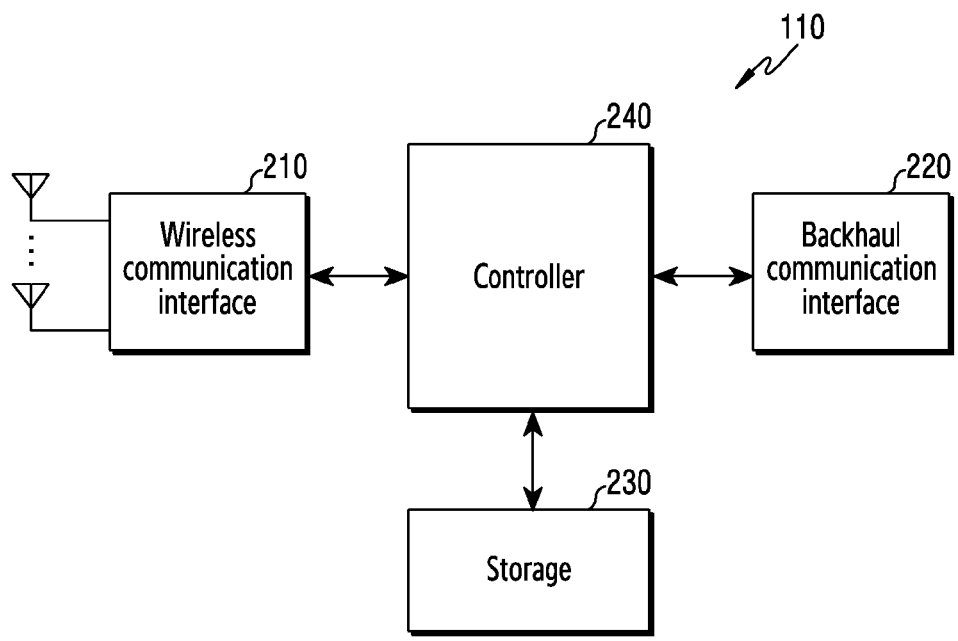

[Fig. 3]
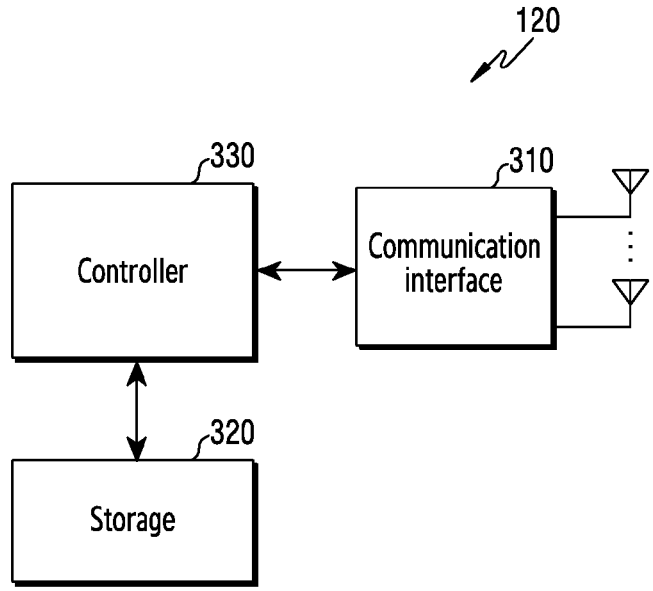
[Fig. 4]
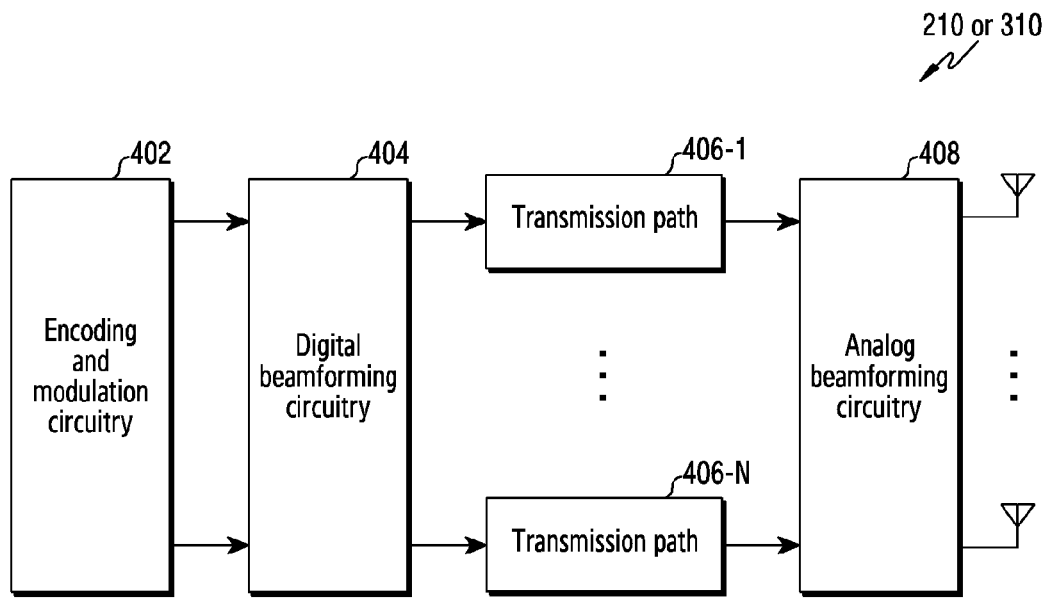
[Fig. 5]
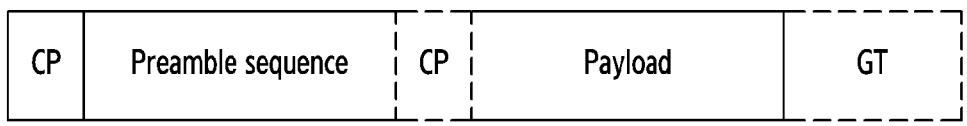

[Fig. 6]
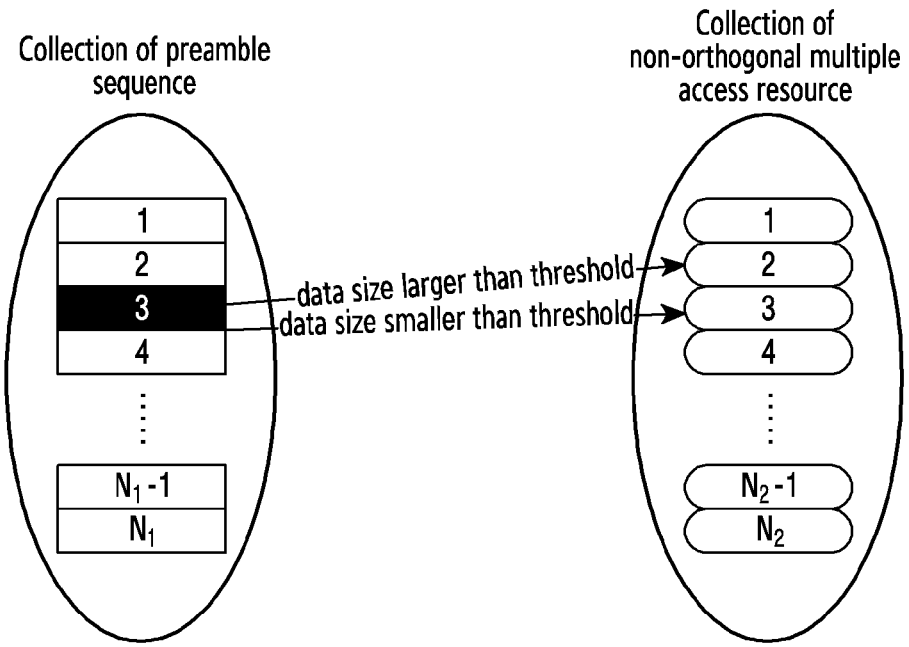
[Fig. 7]
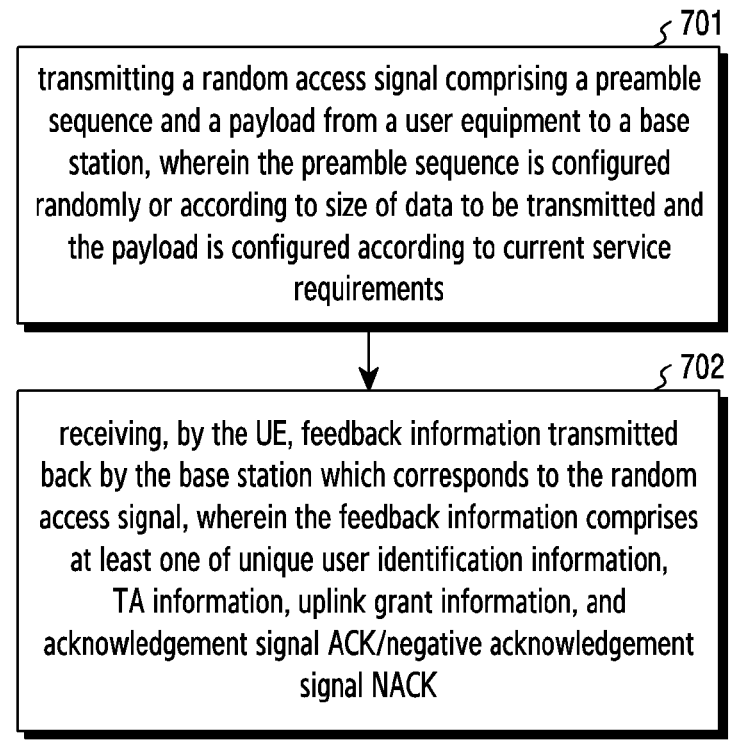

[Fig. 8]
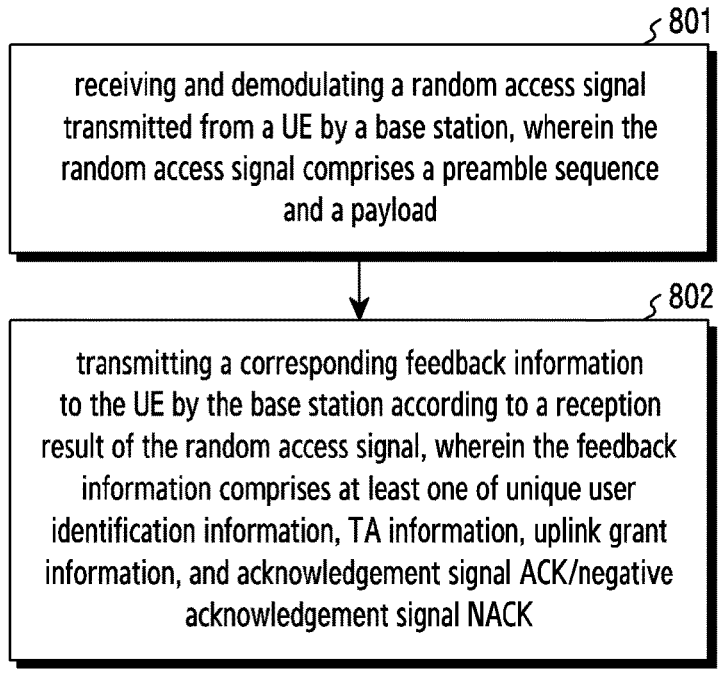
[Fig. 9]
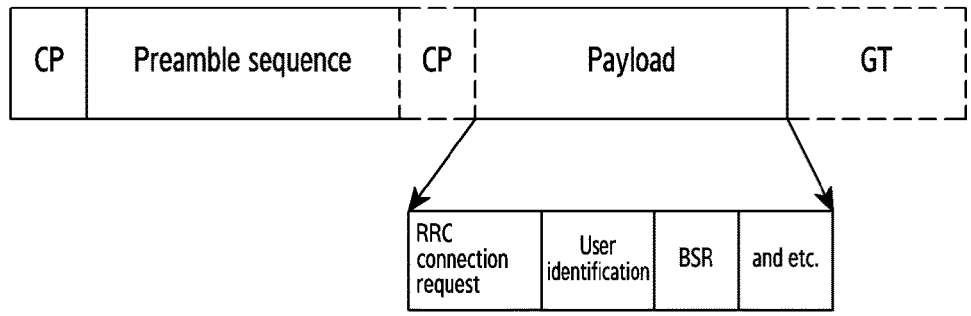
[Fig. 10]
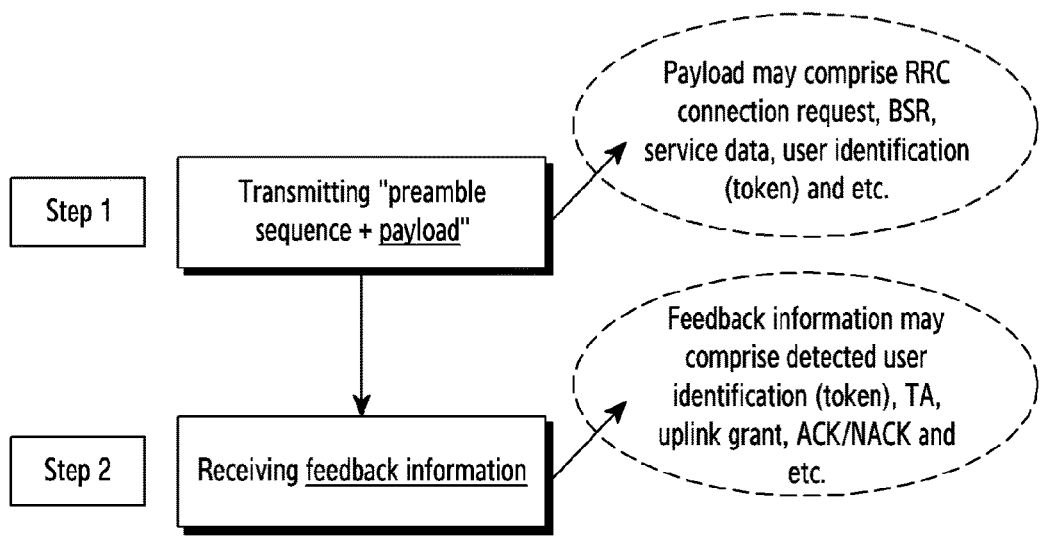

[Fig. 11]
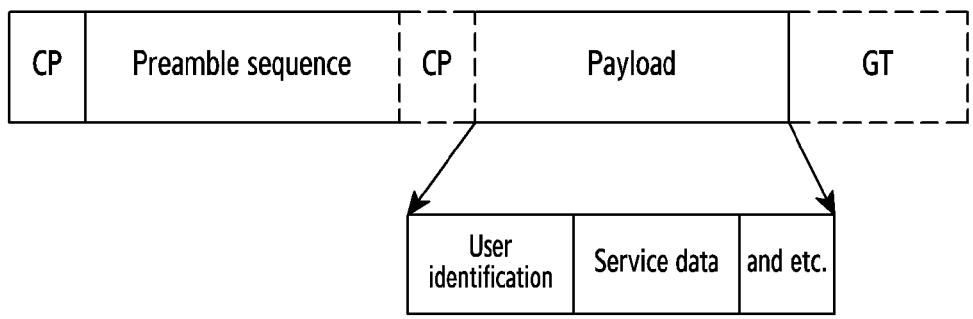
[Fig. 12]
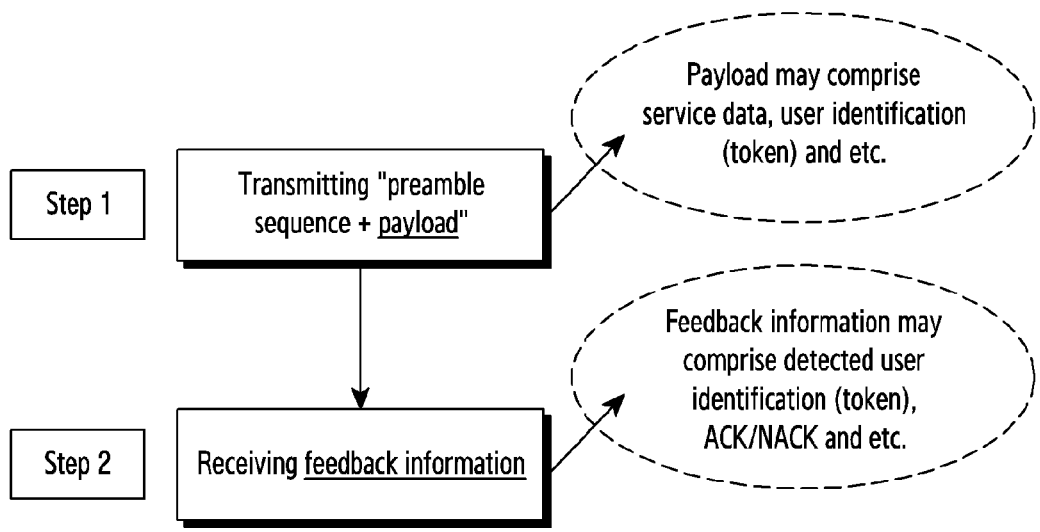

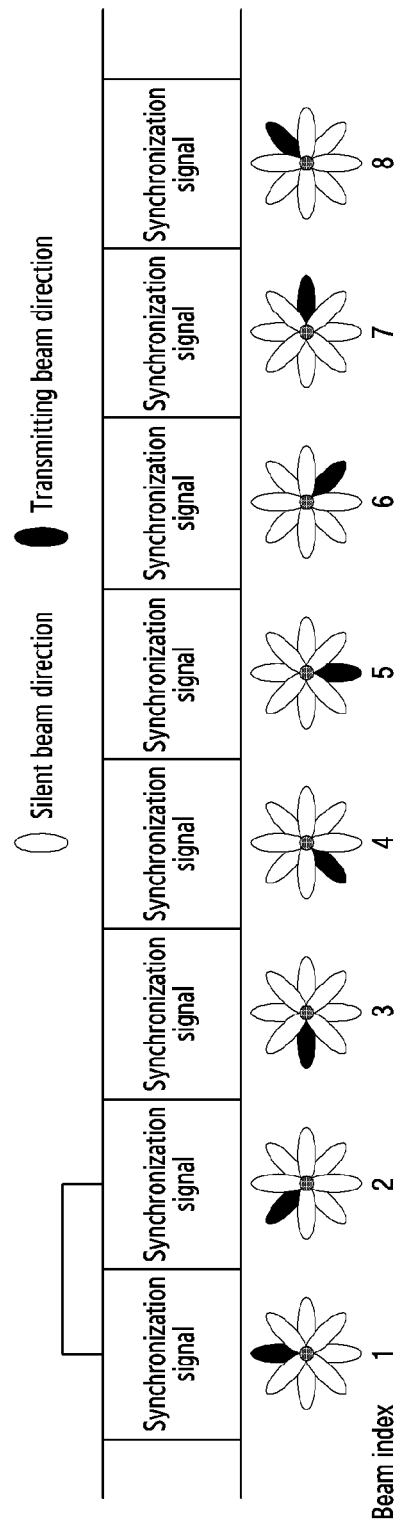
[Fig. 13]

[Fig. 14]
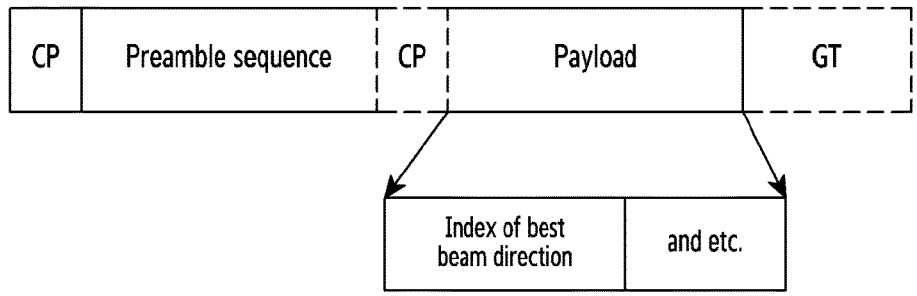
[Fig. 15]
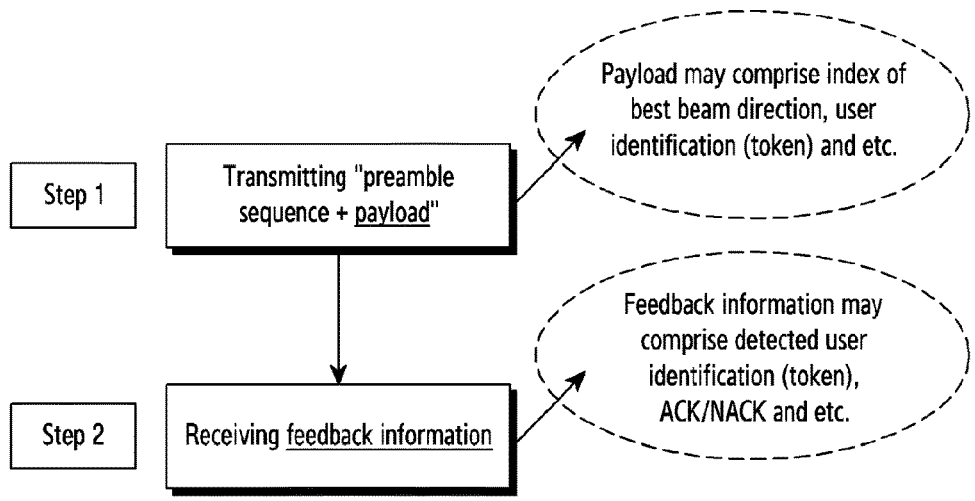
[Fig. 16]
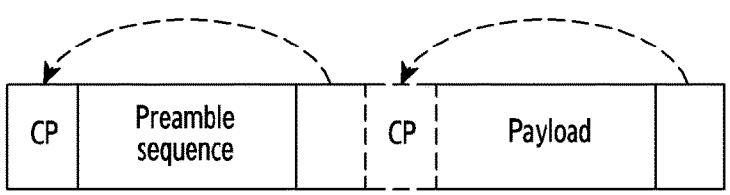
[Fig. 17]
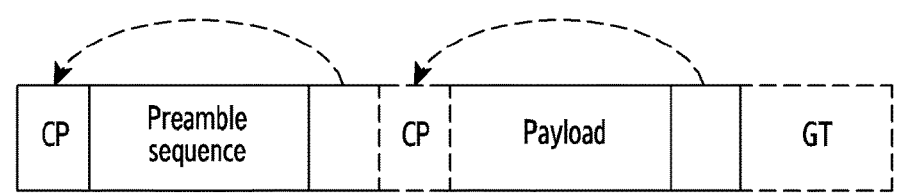
[Fig. 18]
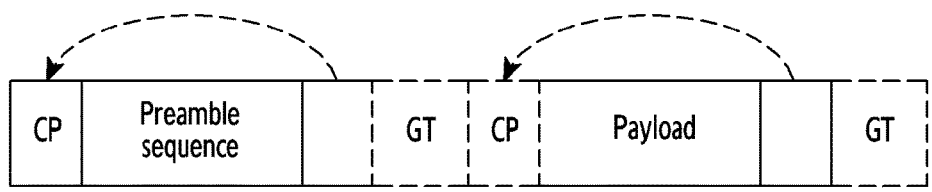

[Fig. 19]
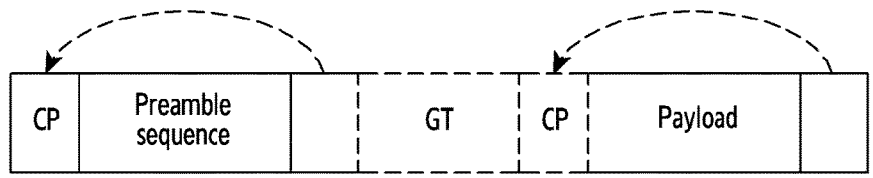
[Fig. 20]
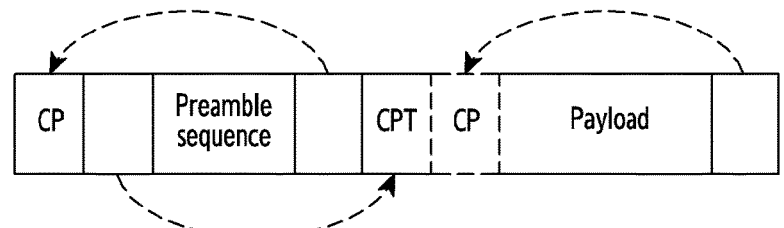
[Fig. 21]
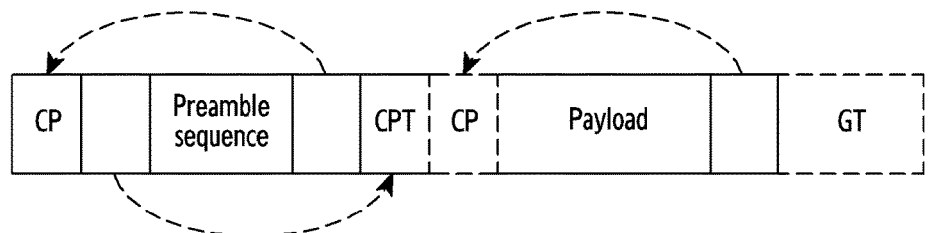
[Fig. 22]
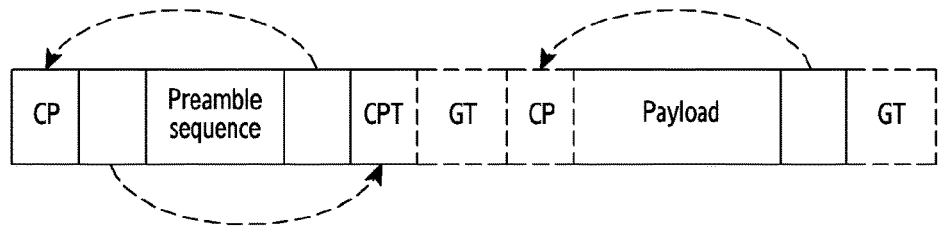
[Fig. 23]
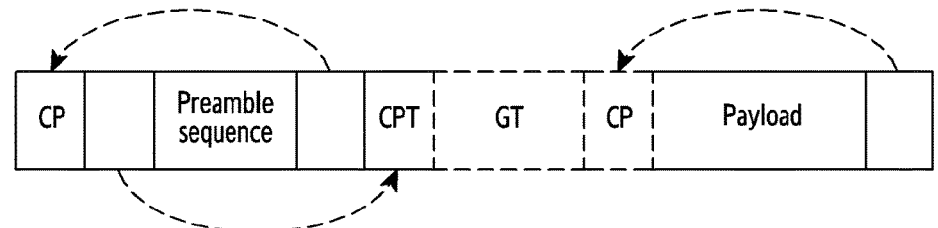
[Fig. 24]
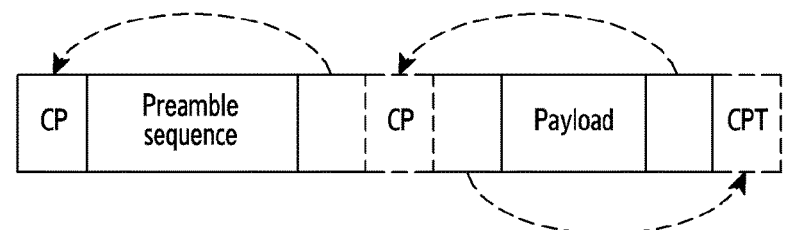

[Fig. 25]
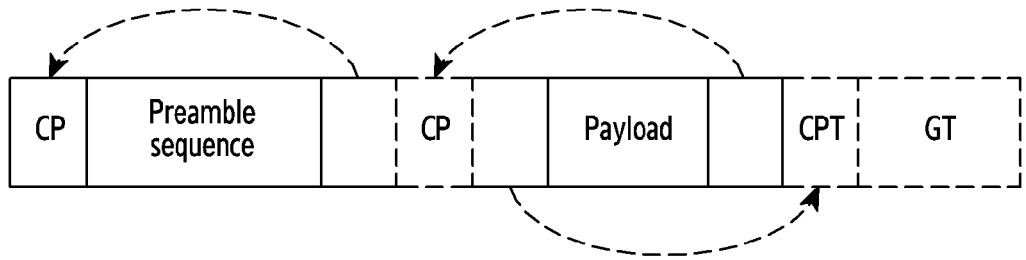
[Fig. 26]
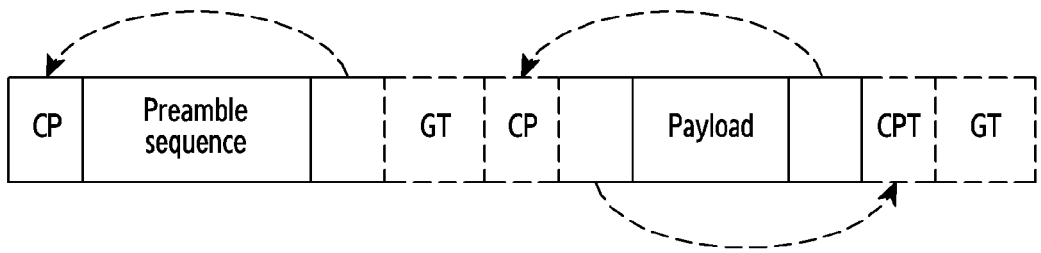
[Fig. 27]
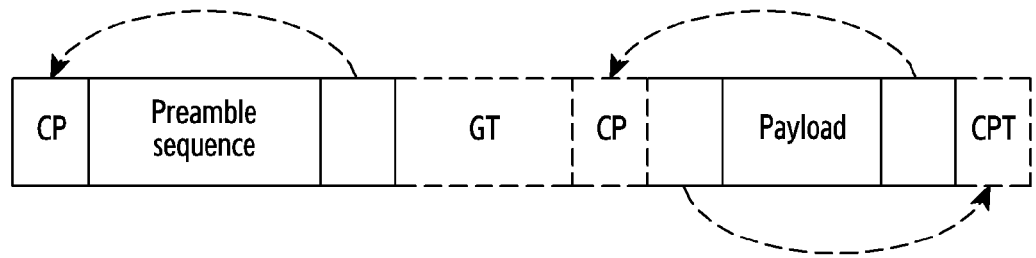
[Fig. 28]
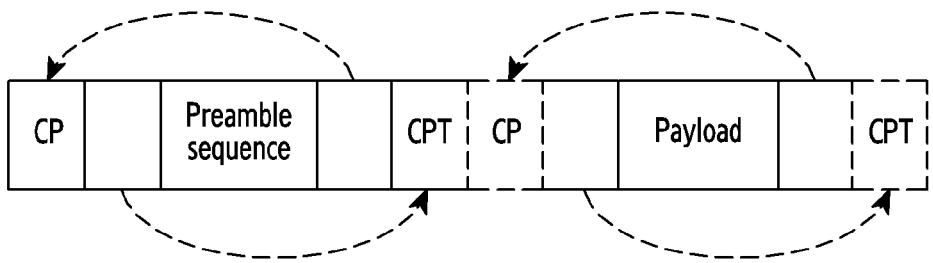
[Fig. 29]
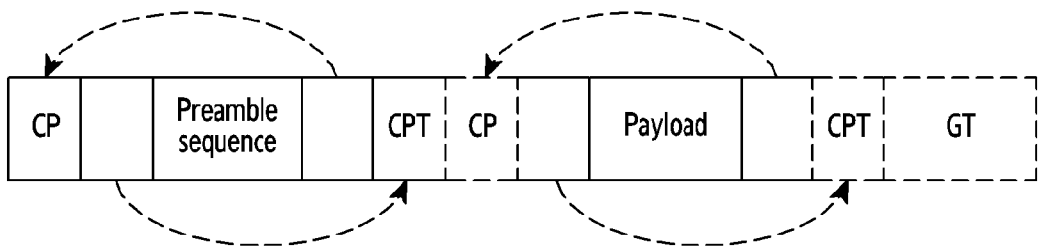

[Fig. 30]
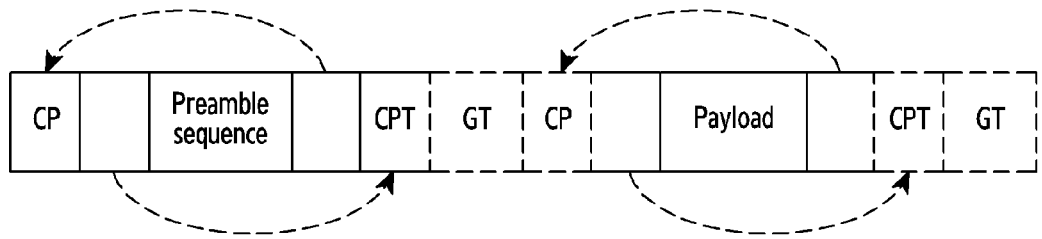
[Fig. 31]
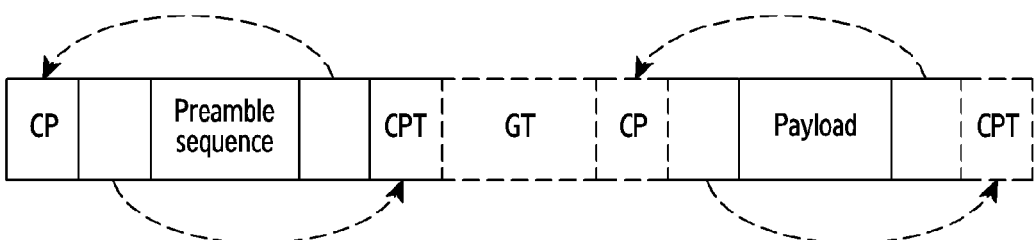
[Fig. 32]
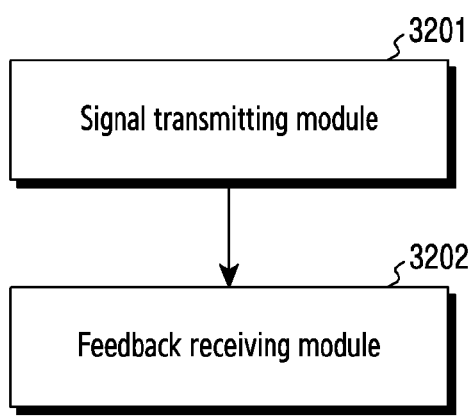
[Fig. 33]
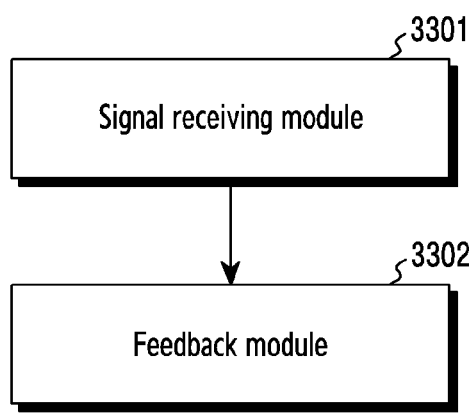

METHOD AND DEVICE FOR PERFORMING A RANDOM ACCESS IN WIRELESS COMMUNICATION SYSTEM

CROSS-REFERENCE TO RELATED APPLICATIONS

This application is a 371 of International Application No. PCT/KR2017/010899 filed on Sep. 29, 2017, which claims priority to Chinese Patent Application No. 201610875849.2 filed on Sep. 30, 2016, the disclosures of which are herein incorporated by reference in their entirety.

BACKGROUND

1. Field

The present disclosure relates to the technical field of wireless communication, and particularly, to a method and a device for performing a random access.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An embodiment of the present disclosure provides a method and a device for performing a random access.

SUMMARY

The present disclosure provides a method and a device for performing a random access.

An embodiment of the present invention provides a method for operating a terminal in a wireless communication system, the method comprising:

transmitting a random access signal comprising a preamble sequence and a payload to a base station, wherein the preamble sequence is configured randomly or according to size of data to be transmitted and the payload is configured according to current service requirements, and receiving feedback information from the base station which corresponds to the random access signal, wherein the feedback information comprises at least one of unique user identification information, timing advance (TA) information, uplink transmission grant information, and acknowledgement (ACK) signal/negative acknowledgement (NACK) signal.

Another embodiment of the present invention provides a method for operating a base station, the method comprising:

receiving and demodulating a random access signal transmitted from a terminal, wherein the random access signal comprises a preamble sequence and a payload; and transmitting a corresponding feedback information to the terminal according to a reception result of the random access signal, wherein the feedback information comprises at least one of unique user identification information, TA information, uplink transmission grant information, and acknowledgement (ACK) signal/negative acknowledgement (NACK) signal.

Optionally, preceding the receiving the random access signal transmitted from the terminal by the base station, the method may further comprise a step of:

configuring and transmitting random access configuration information to the terminal, wherein the random access configuration information comprises a set of preamble resource, time-frequency resource for the payload and the preamble sequence and a mapping relationship between the preamble sequence and the payload.

Optionally, the mapping relationship between the preamble sequence and the payload may be configured randomly or according to a certain rule, and the mapping relationship may be a one-to-one, a one-to-multiple or a multiple-to-one mapping relationship. And optionally, the mapping relationship between the preamble sequence and the payload may be configured randomly with equal probability.

Still another embodiment of the present invention provides a terminal in a wireless communication system, the terminal comprising:

a transceiver configured to transmit and receive signals; and at least one processor configured to:

control the transceiver to transmit a random access signal comprising a preamble sequence and a payload a base station, wherein the preamble sequence is configured randomly or according to size of data to be transmitted and the payload is configured according to current service requirements, and control the transceiver to receive feedback information from the base station which corresponds to the random access signal, wherein the feedback information comprises at least one of unique user identification information, TA information, uplink transmission grant information, and acknowledgement (ACK) signal/negative acknowledgement (NACK) signal.

Yet another embodiment of the present invention provides a base station in a wireless communication system, the base station comprising, the base station comprising:

a transceiver configured to transmit and receive signals; and at least one processor configured to:

control the transceiver to receive and demodulate a random access signal transmitted from a terminal, wherein the random access signal comprises a preamble sequence and a payload; and control the transceiver to transmit a corresponding feedback information to the terminal according to a reception result of the random access signal, wherein the feedback information comprises at least one of unique user identification information, TA information, uplink transmission grant information, and acknowledgement (ACK) signal/negative acknowledgement (NACK) signal.

Various embodiments of the present disclosure provide random access schemes that are more effective.

BRIEF DESCRIPTION OF THE DRAWINGS

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 is a view schematically illustrating a structure of a random access signal in an embodiment of the present disclosure;

FIG. 6 is a view exemplarily illustrating a mapping rule between a preamble sequence and a set of non-orthogonal multiple access resource in an embodiment of the present disclosure;

FIG. 7 is a view illustrating a flowchart of a method for random access in an embodiment of the present disclosure;

FIG. 8 is a view illustrating a flowchart of a method for random access in another embodiment of the present disclosure;

FIG. 9 is a view schematically illustrating a structure of a random access signal and a structure of a payload when continuous transmission is performed in a first embodiment of the present disclosure;

FIG. 10 is a view schematically illustrating a simplified transmission step for random access requiring radio resource control (RRC) in a first embodiment of the present disclosure;

FIG. 11 is view schematically illustrating a structure of a random access signal and a structure of a payload when small package service is provided in a second embodiment of the present disclosure;

FIG. 12 is a view schematically illustrating a simplified transmission step for random access in the second embodiment of the present disclosure;

FIG. 13 is a view schematically illustrating transmission of a synchronization signal based on beam polling in a third embodiment of the present disclosure;

FIG. 14 is a view schematically illustrating a structure of a random access signal and a structure of a payload when index of the best beam direction is feedback in the third embodiment of the present disclosure;

FIG. 15 is a view schematically illustrating a simplified transmission step for random access when index of the best beam direction index is fed back in the third embodiment of the present disclosure;

FIG. 16 is a first example of a structure of a random access channel of the present disclosure;

FIG. 17 is a second example of the structure of the random access channel of the present disclosure;

FIG. 18 is a third example of the structure of the random access channel of the present disclosure;

FIG. 19 is a fourth example of the structure of the random access channel of the present disclosure;

FIG. 20 is a fifth example of the structure of the random access channel of the present disclosure;

FIG. 21 is a sixth example of the structure of the random access channel of the present disclosure;

FIG. 22 is a seventh example of the structure of the random access channel of the present disclosure;

FIG. 23 is an eighth example of the structure of the random access channel of the present disclosure;

FIG. 24 is a ninth example of the structure of the random access channel of the present disclosure;

FIG. 25 is a tenth example of the structure of the random access channel of the present disclosure;

FIG. 26 is an eleventh example of the structure of the random access channel of the present disclosure;

FIG. 27 is a twelfth example of the structure of the random access channel of the present disclosure;

FIG. 28 is a thirteenth example of the structure of the random access channel of the present disclosure;

FIG. 29 is a fourteenth example of the structure of the random access channel of the present disclosure;

FIG. 30 is a fifteenth example of the structure of the random access channel of the present disclosure;

FIG. 31 is a sixteenth example of the structure of the random access channel of the present disclosure;

FIG. 32 is a view schematically illustrating a structure of a device for random access in an embodiment of the present disclosure; and FIG. 33 is a view schematically illustrating a structure of a device for random access in an embodiment of the present disclosure.

DETAILED DESCRIPTION

Embodiments of the present disclosure will be described in detail hereinafter. Examples of the embodiments are illustrated in the accompanying drawings throughout which like or similar reference numbers are used to indicate like or similar elements or elements with like or similar functions. The embodiments described in the following taken in conjunction with the accompanying drawings are exemplary, which are provided only for the purpose of explaining rather than limiting the present disclosure.

It will be understood by one of skill in the art that, unless otherwise defined herein, all the terms used herein (including technical and scientific terms) may have the same meaning as those generally understood by one of ordinary skill in the art. It will be further understood that terms, such as those defined in a commonly used dictionary, should also be interpreted as is customary in the context of the prior art and not in an idealized or overly formal sense unless expressly so defined herein.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for performing a random access in a wireless communication system.

The terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "UE."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may includes at least one processor.

According to exemplary embodiments of the present disclosure, the controller 240 may control to receive and to demodulate a random access signal transmitted from a terminal, wherein the random access signal comprises a preamble sequence and a payload; and to transmit a corresponding feedback information to the terminal by the base station according to a reception result of the random access signal, wherein the feedback information comprises at least one of unique user identification information, timing advance information, uplink transmission grant information, and acknowledgement (ACK) signal/negative acknowledgement (NACK) signal. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to exemplary embodiments of the present disclosure, the controller 330 may control to transmit a random access signal comprising a preamble sequence and a payload to a base station, wherein the preamble sequence is configured randomly or according to size of data to be transmitted and the payload is configured according to current service requirements; and to receive feedback information from the base station which corresponds to the random access signal, wherein the feedback information comprises at least one of unique user identification information, timing advance information, uplink transmission grant information, and acknowledgement (ACK) signal/ negative acknowledgement (NACK) signal. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

The rapid development of information industry, particularly the increasing demand from the mobile Internet and the Internet of Things (IoT), brings about unprecedented challenges in the future mobile communications technology. According to the ITU-R M. [IMT.BEYOND 2020.TRAFFIC] issued by the International Telecommunication Union (ITU), it can be expected that, by 2020, mobile services traffic will grow nearly 1,000 times as compared with that in 2010 (4G era), and the number of terminal connections will also be over 17 billion. With a vast number of IoT devices gradually expand into the mobile communication network, the number of connected equipment will be even more astonishing. In response to this unprecedented challenge, the communications industry and academia have prepared for 2020s by launching an extensive study on the fifth generation (5G) of mobile communications technology. Currently, the framework and overall objectives of the future 5G have been discussed in ITU-R M. [IMT.VISION] from ITU, in which the demands outlook, application scenarios and various important performance indexes of 5G have been described in detail. In terms of new demands in 5G, the ITU-R M. [IMT.FUTURE TECHNOLOGY TRENDS] from ITU provides information related to the 5G technology trends, which is intended to address prominent issues such as significant improvement on system throughput, consistency of the user experience, scalability to support IoT, delay, energy efficiency, cost, network flexibility, support for new services and flexible spectrum utilization, etc.

Considering more diversified service scenarios in 5G, flexible multiple access technology is needed to support different scenarios and service demands. For example, when facing a service scenario in which a vast number of connections are required, how to allow more terminal to access the limited resources has become a key problem to be solved in 5G multiple access technology. Multiple access technology based on orthogonal frequency division multiplexing (OFDM) is commonly used in current 4G LTE network. In order to avoid interference between multiple terminals, synchronous transmission is adopted in LTE. That is, the arrival time of the uplink signal for the multiple terminals to the base stain is aligned strictly. A LTE system uses uplink timing advance (TA) so as to achieve uplink synchronous transmission. The base station informs a mobile terminal a TA of the transmission time of an uplink signal as compared to the reception time of a downlink signal by using a downlink control signaling. A mobile terminal is usually deemed as being in a state of losing synchronization before the base station obtains an initial TA of the terminal. The mobile terminal in the state of losing synchronization is not allowed to transmit uplink data so as to avoid potential interference. A process in which the base station obtains the initial TA of a mobile terminal is referred to as an uplink synchronization process. A way of adopting the random access process in the LTE uplink synchronization is that: in a competition mode, the process begins by transmitting a randomly selected physical random access channel (PRACH) preamble from the terminal, and the base station detects the preamble signal, estimates the time for receiving the uplink signal and calculates the value of the TA according to the estimated time. After the transmission of the random access preamble, there are three subsequent steps to perform so as to complete the whole random access process:

Step 1: transmitting a random access preamble from the terminal to the base station;

Step 2: transmitting a random access response back from the base station to the terminal;

Step 3:transmitting message 3 from the terminal to the base station;

Step 4: transmitting message indicating that the competition is resolved from the base station to the terminal.

In the LTE system, the PRACH preamble comprises two parts that are a cyclic prefix (CP) and a sequence, the lengths of the CP and/or the sequence vary in preambles of different format. In frequency domain, each of the PRACHs described above occupies 6 physical resource blocks (PRB), with each PRB comprising 12 subcarriers and the bandwidth of each subcarrier being 15 kHz.

The random access response mentioned in step 2 comprises TA information and the terminal transmits the message 3 according to the TA information in step 3. In the LTE standard, a mobile terminal will enter the state of losing synchronization if it turns into IDLE state or has not received the TA signaling for a long time. If it is found that uplink data shall be transmitted by a terminal in the state of losing synchronization, a whole random access process shall be performed so that the terminal may enter a state of uplink synchronization. As described hereinbefore, data characteristic of terminals in IoT is that little data is transmitted sporadically in a long time period and the number of access equipment is large. The long time period means that the terminals will enter sleep state after data is transmitted so as to reduce energy consumption, which means that the terminals will lose uplink synchronization and the random access process shall be performed again before they transmit data again. In a scenario with little data and large number of access equipment, the efficiency of such frequent random access process becomes low, and specifically, a lot of overheads are spent on performing the random access process while little data is transmitted per overhead.

Meanwhile, it is obviously difficult for the existing orthogonal access method to meet the requirements in 5G that spectrum efficiency increases 5 to 15 times and the number of access terminal per square kilometer reaches a million level. However, non-orthogonal multiple access (NoMA) may improve the number of supported terminal connections by multiplexing same resources among terminals. Since terminal has more chances to access, the overall throughput of the network and spectrum efficiency may be improved. Moreover, when facing a scenario of massive machine type communication (mMTC), multiple access technologies in which operations are simpler may be needed by taking the costs of the terminals and the complexity of implementation into account. In a service scenario of low delay or low energy consumption, by using NoMA technology, scheduling-competition free access and low delay communication may be achieved better, and the on-time of the devices and thus the energy consumption thereof may be reduced. Researches are now focused on non-orthogonal multiple access technologies such as multiple user shared access (MUSA), non-orthogonal multiple access (NOMA), pattern division multiple access (PDMA), sparse code multiple access (SCMA), interleave division multiple access (IDMA) and etc. Users are distinguished by using a codeword in MUSA, a codebook in SCMA, power in NOMA, different characteristic patterns in PDMA, and interleave sequences in IDMA. For details of IDMA, reference may be made to "Interleave Division Multiple Access" (Li Ping, Lihai Liu, Keying Wu and W. K. Leung, IEEE Transactions on Wireless Communication, Vol. 5, No.4, pp. 938-947, April 2006).

The method for random access in the prior art comprises four interactive steps to complete uplink synchronization and uplink transmission grant, which will be limited when facing new services and requirements in 5G. For example, many terminals only need to transmit a small packet to the base station sporadically and the number of the terminals may reach a million per square kilometers in the scenario of mMTC, therefore a random access process comprising 4 steps may cause very large control signaling overhead in such a scenario. Meanwhile, random access accomplished by performing 4 interactive steps may not support services with higher requirements on time delay.

The present disclosure provides a method for random access. Terminal reads system messages to obtain random access configuration information configured by a network, for example, a time-frequency resource position for the random access, configuration information of a preamble sequence or the like. For example, the terminal reads messages related to master information blocks (MIB) or system information blocks (SIB) from physical broadcast channel (PBCH). By analyzing the prior art, it can be found that a terminal performs traditional random access operation for two purposes. One of the two purposes is uplink synchronization which can be realized by obtaining TA information, and another thereof is to get uplink transmission grant which can be realized by obtaining uplink grant message. The method for random access provided by the present disclosure not only allows realizing the above two purposes but also provides flexible supports to other services.

It is to be noted that the random access signal transmitted by the user is composed of a cyclic prefix CP1 (the cyclic prefix of the preamble sequence), the preamble sequence, a cyclic prefix CP2 (the cyclic prefix of a payload), the payload and a guard time (GT) as shown in FIG. 5 which schematically illustrates the structure of a random access signal in an embodiment of the present disclosure. Meanwhile, the GT can be provided in the middle, so as to improve detection accuracy, and the length of the cyclic prefix CP1 can be configured to be same as that of the cyclic prefix CP2.

Next, the terminal obtains the configuration information of a selectable preamble sequence and the time-frequency resource position that can be used to transmit the preamble sequence and the payload from the random access configuration information that it read. Meanwhile, the random access configuration information indicates the following information: the resource position used to transmit the preamble sequence for random access, as well as the mapping relationship between the preamble sequence and the payload. The mapping relationship indicates at least one of: the mapping relationship between the preamble sequence for random access and the position and size of a corresponding payload, the mapping relationship between the preamble sequence for random access and the modulation and coding scheme (MCS) of a corresponding payload, the mapping relationship between the preamble sequence for random access and the demodulation reference signal (DMRS) that can be adopted by a corresponding payload, and even the mapping relationship between the preamble sequence for random access and the non-orthogonal multiple access resource (for example, a codebook, an interleaver, a grid mapping pattern, codeword resource and etc.) that can be used by a corresponding payload when non-orthogonal multiple access is adopted. The above mapping relationship between the preamble sequence and the DMRS may further comprise the following situations:

1. When DMRS is used to estimate channel user data demodulation, two or more preamble sequences for random access correspond to a same payload time-frequency resource, and DMRSs of the payload corresponding to a respective preamble sequence are orthogonal or quasi-orthogonal to each other. A DMRS can be the corresponding preamble sequence for random access itself, with the two or more preamble sequences for random access being orthogonal or quasi-orthogonal to each other. The DMRS may also be orthogonal or quasi-orthogonal reference signals corresponding to the preamble sequence for random access as indicated by the mapping relationship. In such a situation, when transmitting the preamble sequence for random access and the payload by using corresponding transmission resource, it is further necessary to transmit orthogonal or quasi-orthogonal reference signals corresponding to the preamble sequence for random access as indicated by the mapping relationship by using corresponding payload resource; and 2. If the channel user data demodulation is estimated by using a preamble sequence, this kind of configuration can be indicated in configuration information on network-side and thus terminals do not provide resource for DMRS in the payload.

The above mapping relationship between the preamble sequence and the non-orthogonal multiple access resource can be further embodied as: one preamble sequence corresponding to two or more non-orthogonal multiple access resource. Specifically, for example, one preamble sequence may correspond to a plurality of interleavers. After the terminal selects the preamble sequence, it may find a set of usable non-orthogonal multiple access resource according to the mapping relationship and select one therefrom randomly. Alternatively, the non-orthogonal multiple access resource can be divided into groups and selected for use according to a certain rule. In addition to being selected randomly, the mapping relationship between the preamble sequence and the non-orthogonal multiple access resource can be selected according to a certain rule which can be:

1. a selection rule based on the size of the data block to be transmitted. For example, FIG. 6 illustrates an exemplary mapping rule between the preamble sequence and a set of non-orthogonal multiple access resource in an embodiment of the present disclosure. It can be seen from FIG. 6 that group 2 of non-orthogonal multiple access resource is selected when data block is larger than a threshold value and group 3 of non-orthogonal multiple access resource is selected when the data block is smaller than the threshold value; or 2. a selection rule based on demodulation pilot resource. Specifically, mapping relationships are established among a preamble sequence, a demodulation pilot and a non-orthogonal multiple access resource pool. A preamble sequence is mapped to a demodulation pilot to be used, and then the demodulation pilot to be used is mapped to a non-orthogonal multiple access resource pool to be used. Each of the mapping relationships can be a one-to-one, a one-to-multiple or a multiple-to-one mapping relationship.

On the basis of the above mapping relationships, the terminal may be informed of the mapping relationships determined by the network side through physical downlink broadcast channel, physical downlink shared channel or physical downlink control channel.

After a terminal reads necessary system configuration information, a method for random access provided by the present disclosure is used. It is to be noted that the method for random access provided by the present disclosure is described from a terminal perspective and it can be embodied as a computer program by programming so as to be performed on a terminal-related device.

FIG. 7 illustrates a flowchart showing a method for random access according to an embodiment of the present disclosure, which comprises the steps of:

Step 701: transmitting a random access signal comprising a preamble sequence and a payload from a terminal to a base station, wherein the preamble sequence is configured randomly or according to size of data to be transmitted and the payload is configured according to current service requirements.

Specifically, the terminal can select the preamble sequence randomly or according to size of data to be transmitted and select parameters (including information included in the payload, resource length and MCS) used to transmit the payload according to service requirements (single transmission, continuous transmission or more). The information included in the payload can be unique user identification information (user identification or token), service data, buffer status report (BSR) or more, depending on different service requirements. If beam polling is used by network side when searching for a synchronization channel, the terminal can report index of the best beam direction within the payload. Similarly, the terminal can report to the network side its ability to support a variety of digital numerology and his ability to support a variety of services.

Step 702: receiving by the terminal feedback information transmitted back by the base station which corresponds to the random access signal, wherein the feedback information comprises at least one of unique user identification information, TA information, uplink transmission grant information, and acknowledgement (ACK) signal/negative acknowledgement (NACK) signal.

Specifically, the base station detects the preamble sequence in the time-frequency resource used for random access. If the transmission of a preamble sequence (referred to as preamble 1) is detected and thus the MCS, the demodulation pilot resource (if used) and the non-orthogonal multiple access resource (if used) of a payload following the preamble sequence are known from the mapping relationship, detection and decoding can be performed on the payload. It is to be noted that the demodulation pilot resource is equivalent to the demodulation reference signal (DMRS) throughout the specification. If the detection and decoding is performed correctly, information carried by the payload can be obtained, which are, for example, radio resource control connection request, cache status report, channel quality information, service data, non-access layer message, unique user identification information, beam direction index or the like. It is necessary for the network side to transmit feedback information according to the received information. The feedback information may comprise:

1. ACK signal if the preamble sequence and the payload are correctly detected and decoded by the network side. In this situation, it is indicated that the whole payload is decoded correctly which implies that the initial service data is detected and decoded correctly if it is transmitted by the terminal; or 2. NACK signal if the preamble sequence is correctly detected and decoded but the payload cannot be detected or decoded correctly by the network side. In other words, the NACK signal is transmitted directly.

Furthermore, the terminal may detect the feedback information in a fixed time window when receiving the feedback information. The starting time of the time window is calculated according to the time at which the preamble sequence for random access or the payload is transmitted. If no feedback information is successfully detected within the time window, it is determined that neither the preamble sequence for random access nor is the payload successfully received. Therefore the preamble sequence for random access and the payload will be re-transmitted.

The terminal can learn about the following three situations from the obtaining of the feedback information:

1. The preamble sequence and the payload from the terminal are detected and decoded correctly, if the feedback information comprises unique user identification information (for example, terminal ID, token and etc.) and the ACK signal. Also, the terminal can know whether the transmitted data is detected and decoded correctly from other information existed in the feedback information. For example, if a correct uplink transmission grant is received, it is indicated that the BSR is demodulated correctly. Furthermore, the feedback information can comprise TA for helping the terminal to achieve uplink synchronization. When the feedback information comprises uplink transmission grant, the terminal can transmit data by using allocated uplink resource.

2. The preamble sequence of the terminal is demodulated correctly while the payload is not demodulated correctly if NACK signal is detected in the feedback information; alternatively, it is of large possibility that the preamble sequence of the terminal collides with that of other terminal if no unique user identification information is detected in the feedback information (or the detected unique user identification information is different from that of the terminal itself). In such a situation, the terminal can back-off randomly for a time period and then re-transmit a preamble sequence and the payload. When re-transmitting, the terminal can re-select a preamble sequence, and thus the MCS, the demodulation pilot resource and etc. may be different. Meanwhile, the probability of being detected correctly can be improved by the way of increasing power and etc.

3. No feedback information is detected by the terminal, which means that the preamble sequence for random access of the terminal is not detected correctly. In such a situation, the terminal can back-off randomly for a time period and then re-transmit a preamble sequence and the payload. When re-transmitting, the terminal can re-select a preamble sequence, and thus the MCS, the demodulation pilot resource and etc. may be different. Meanwhile, the probability of being detected correctly can be improved by the way of increasing power and etc.

Furthermore, a method for random access is provided in another embodiment of the present disclosure. It is to be noted that the method for random access provided by this embodiment is described from a base station perspective, and it can be embodied as a computer program by programming so as to be performed on a base station-related device.

Specifically, reference may be made to FIG. 8 which illustrating a flowchart of the method for random access according to the embodiment of the present disclosure. In order to make the object, the technical solutions and the advantages of the present disclosure clearer, the present disclosure will be described in detail hereinafter in conjunction with the accompanying drawings and examples.

The method for random access comprises the steps of:

Step 801: receiving and demodulating a random access signal transmitted from a terminal by a base station, wherein the random access signal comprises a preamble sequence and a payload.

Specifically, the terminal can select a respective preamble sequence randomly or according to size of data to be transmitted and select parameters (including information included in the payload, resource length and MCS) used to transmit the payload according to service requirements (single transmission, continuous transmission or more). The information included in the payload can be unique user identification information (user identification or token), service data, BSR or more, depending on different service requirements. If beam polling is used by network side when searching for a synchronization channel, the terminal can report the index of the best beam direction within the payload. Similarly, the terminal can report to the network side its ability to support a variety of digital numerology and its ability to support a variety of services.

Step 802: transmitting corresponding feedback information to the terminal by the base station according to a reception result of the random access signal, wherein the feedback information comprises at least one of unique user identification information, timing advance information, uplink transmission grant information, and ACK signal/NACK signal.

The reception result of the random access signal may comprise, for example, a demodulation result of the random access signal.

Specifically, the base station detects the preamble sequence in the time-frequency resource used for random access. If the transmission of a preamble sequence (referred to as preamble 1) is detected and thus the MCS, the demodulation pilot resource (if used) and the non-orthogonal multiple access resource (if used) of a payload following the preamble sequence are known from the mapping relationship, detection and decoding can be performed on the payload. If the detection and decoding are performed correctly, information carried by the payload can be obtained, which is, for example, radio resource control connection request, BSR, channel quality information, service data, non-access layer message, unique user identification information, beam direction index or more. Feedback information needs to be transmitted according to the received information by network side. The feedback information may comprise:

1. ACK signal if the preamble sequence and the payload are correctly detected and decoded by the network side. In this situation, it is indicated that the whole payload is decoded correctly, which implies that the initial service data is detected and decoded correctly if it is transmitted by the terminal; or 2. NACK signal if the preamble sequence is correctly detected and decoded but the payload is neither detected nor decoded correctly by the network side. In other words, the NACK signal is transmitted directly.

Furthermore, the terminal may detect the feedback information in a fixed time window when receiving the feedback information. The starting time of the time window is calculated according to the time at which the preamble sequence for random access or the payload is transmitted. If no feedback information is successfully detected within the time window, it is determined that neither the preamble sequence for random access nor is the payload successfully received. Therefore the preamble sequence for random access and the payload will be re-transmitted.

The terminal can learn about the following three situations from the feedback information:

1. The preamble sequence and the payload from the terminal are detected and decoded correctly, if the feedback information comprises unique user identification information (for example, terminal ID, token and etc.) and the ACK signal. Also, the terminal can know whether the transmitted data is detected and decoded correctly from other information existed in the feedback information. For example, if a correct uplink transmission grant is received, it is indicated that the BSR is demodulated correctly. Furthermore, the feedback information can comprise TA for helping the terminal to achieve uplink synchronization. When the feedback information comprises uplink transmission grant, the terminal can transmit data by using allocated uplink resource.

2. The preamble sequence from the terminal is demodulated correctly while the payload is not demodulated correctly, if NACK signal is detected in the feedback information; alternatively, the preamble sequence of the terminal collides with that of other terminal if no unique user identification information is detected in the feedback information (or the detected unique user identification information is different from that of the terminal itself). In such a situation, the terminal can back-off randomly for a time period and then re-transmit a preamble sequence and the payload. When re-transmitting, the terminal can re-select a preamble sequence, and thus the MCS, the demodulation pilot resource and etc. may be different. Meanwhile, the probability of being detected correctly can be improved by the way of increasing power and etc.

3. No feedback information is detected by the terminal, which means that the preamble sequence for random access of the terminal is not detected correctly. In such a situation, the terminal can back-off randomly for a time period and then re-transmit a preamble sequence and the payload. When re-transmitting, the terminal can re-select a preamble sequence, and thus the MCS, the demodulation pilot resource and etc. may be different. Meanwhile, the probability of being detected correctly can be improved by the way of increasing power and etc.

In order to facilitate the understanding and the practicing of the technical solutions of the present disclosure, detailed description will be provided hereinafter in conjunction with exemplary embodiments.

First Embodiment

The methods for random access provided by the present disclosure will be described through specific designs of the payload in this embodiment. In present embodiment, a terminal needs to transmit a pre-determined amount of service data and cannot transmit all the data through a single transmission, and thus it is desired to perform a normal process for random access to obtain uplink transmission grant so as to transmit data continuously. In such a situation, the payload mainly comprises RRC connection request, BSR, unique user identification information. The terminal can obtain random access configuration information by reading a system message (for example, reading MIB or SIB message from downlink PBCH), which is for example the time-frequency resource position, the configuration information of the preamble sequence and etc. By analyzing the prior art, it can be found that a terminal performs traditional random access operation for two purposes. One of the two purposes is uplink synchronization which can be realized by obtaining TA information, and the other thereof is to get uplink transmission grant which can be realized by obtaining uplink grant message. The new method for random access provided by the present disclosure not only allows realizing the above two purposes but also provides flexible supports to other services.

It is to be noted that the random access signal transmitted by the terminal is composed of a cyclic prefix CP1 (the CP of the preamble sequence), the preamble sequence, a cyclic prefix CP2 (the cyclic prefix of the payload), the payload and a guard time (GT) as shown in FIG. 9. The length of the cyclic prefix CP1 can be configured to be same as that of the cyclic prefix CP2 for accuracy detection. The structure of the payload is shown in FIG. 9 which comprises RRC connection request, user identification (or token), BSR and other data.

Next, the terminal obtains the configuration information of a selectable preamble sequence and the time-frequency resource position that can be used to transmit the preamble sequence and the payload from the random access configuration information that it read. Meanwhile, the random access configuration information can indicate the following information: the resource position used to transmit the preamble sequence for random access, as well as the mapping relationship between the preamble sequence and the payload. The mapping relationship indicates at least one of: the mapping relationship between the preamble sequence for random access and the position and size of a corresponding payload, the mapping relationship between the preamble sequence for random access and the MCS of a corresponding payload, the mapping relationship between the preamble sequence for random access and the DMRS that can be adopted by a corresponding payload, and even the mapping relationship between the preamble sequence for random access and the non-orthogonal multiple access resource (for example, a codebook, an interleaver, a grid mapping pattern, codeword resource and etc.) that can be used by a corresponding payload when non-orthogonal multiple access is adopted. The above mapping relationship between the preamble sequence and the DMRS may further comprise the following situations:

when DMRS is used to estimate channel user data demodulation, two or more preamble sequences for random access correspond to a same payload time-frequency resource, and DMRSs of the payload corresponding to a respective preamble sequence are orthogonal or quasi-orthogonal to each other. A DMRS can be the corresponding preamble sequence for random access itself, with the two or more preamble sequences for random access being orthogonal or quasi-orthogonal to each other. The DMRS may also be orthogonal or quasi-orthogonal reference signals corresponding to the preamble sequence for random access as indicated by the mapping relationship. In such a situation, when transmitting the preamble sequence for random access and the payload by using corresponding transmission resource, it is further needed to transmit orthogonal or quasi-orthogonal reference signals corresponding to the preamble sequence for random access as indicated by the mapping relationship by using corresponding payload resource; and if the channel user data demodulation is estimated by using a preamble sequence, this kind of configuration can be indicated in configuration information by network-side and thus terminals do not provide resource for DMRS in the payload.

The above mapping relationship between the preamble sequence and the non-orthogonal multiple access resource can be further embodied as: one preamble sequence may correspond to two or more non-orthogonal multiple access resource. Specifically, for example, one preamble sequence may correspond to a plurality of interleavers. After the terminal selects the preamble sequence, it can find a set of usable non-orthogonal multiple access resource according to the mapping relationship and select one therefrom randomly. Alternatively, the non-orthogonal multiple access resource can be divided into groups and selected for use according to a certain rule. In addition to being selected randomly, the mapping relationship between the preamble sequence and the non-orthogonal multiple access resource can be selected according to a certain rule which can be:

1. a selection rule based on the size of the data block to be transmitted. A group of non-orthogonal multiple access resource is selected when data block is larger than or equal to a threshold value, and the other group of non-orthogonal multiple access resource is selected when the data block is smaller than the threshold value; or 2. a selection rule based on demodulation pilot resource. Specifically, mapping relationships are established among a preamble sequence, a demodulation pilot and a non-orthogonal multiple access resource pool. A preamble sequence is mapped to a demodulation pilot to be used, and then the demodulation pilot to be used is mapped to the non-orthogonal multiple access resource pool to be used. Each of the mapping relationships can be a one-to-one, a one-to-multiple or a multiple-to-one mapping relationship.

On the basis of the above mapping relationships, the terminal may be informed of predetermined mapping relationships by the network side through physical downlink broadcast channel, physical downlink shared channel or physical downlink control channel.

Specifically, reference is now made to FIG. 10 which illustrates a flowchart showing data transmission and feedback reception by the terminal in the present embodiment. In the present embodiment, after the terminal reads necessary system configuration information, the process for random access comprises the following steps of:

Step 1:

The terminal can select a corresponding preamble sequence randomly or according to size of data to be transmitted, and, at the same time, select or configure parameters for transmitting the payload according to the purpose for the present access. In the present embodiment, the terminal desires to initiate a RRC connection and transmit a certain amount of data, and the following circumstances may exist:

The payload can comprise information such as RRC connection request, unique user identification information (user identification or token), initial service data and/or BSR, if the terminal only transmits a part of the service data in the initial transmission;

The payload can comprise information such as RRC connection request, unique user identification information (user identification or token) and/or BSR, if the terminal does not transmit any service data in the initial transmission.

Furthermore, the terminal can report the index of the best beam direction in the payload if beam polling is used by network side when searching for a synchronization channel. Similarly, the terminal can report to the network side its ability to support a variety of digital numerology and its ability to support a variety of services.

Step 2:

The base station detects the preamble sequence in the time-frequency resource used for random access. If the transmission of a preamble sequence is detected and thus the MCS, the demodulation pilot resource (if used) and the non-orthogonal multiple access resource (if used) of a payload following the preamble sequence are known from the mapping relationship, detection and decoding can be performed on the payload. If the detection and decoding is performed correctly, information carried by the payload can be obtained, which is, for example, user identification or token, initial service data (if any) and/or buffer status. Feedback information needs to be transmitted according to the received information by network side, which comprises information about whether the initial service data is decoded correctly and/or whether enough uplink transmission time-frequency resource is allocated to all buffered data to be transmitted. The feedback information may comprise:

1. ACK signal if the preamble sequence and the payload are correctly detected and decoded by the network side. In this situation, it is indicated that the whole payload is decoded correctly, which implies that the service data transmitted by the terminal is detected and decoded correctly; or 2. NACK signal if the preamble sequence is correctly detected and decoded but the payload is neither detected nor decoded correctly by the network side (alternatively, the NACK signal is transmitted directly).

Furthermore, the terminal may detect the feedback information in a fixed time window when receiving the feedback information. The starting time of the time window is calculated according to the time at which the preamble sequence for random access or the payload is transmitted. If no feedback information is successfully detected within the time window, it is determined that none of the preamble sequence for random access and the payload is successfully received. Therefore, the preamble sequence for random access and the payload will be re-transmitted.

The terminal can learn about the following three situations from the feedback information:

1. The preamble sequence and the payload from the terminal are detected and decoded correctly, if the feedback information comprises unique user identification information (for example, terminal ID, token and etc.) and the ACK signal. Furthermore, the terminal can provide time-frequency resource for transmitting the remaining buffered data by using the uplink transmission grant obtained from the feedback information. Also, the feedback information can comprise TA for helping the terminal to achieve uplink synchronization.

2. The preamble sequence of the terminal is demodulated correctly while the payload is not demodulated correctly if negative acknowledgement signal NACK is detected in the feedback information. It will be possible that the preamble sequence of the terminal collides with that of other terminal if no unique user identification information is detected in the feedback information (or the detected unique user identification information is different from that of the terminal itself). In such a situation, the terminal can back-off randomly for a time period and then re-transmit a preamble sequence and the payload. When re-transmitting, the terminal can re-select a preamble sequence, and thus the MCS, the demodulation pilot resource and etc. may be different. Meanwhile, the probability of being detected correctly can be improved by the way of increasing power and etc.

3. No feedback information is detected by the terminal, which means that the preamble sequence for random access of the terminal is not detected correctly. In such a situation, the terminal can back-off randomly for a time period and then re-transmit a preamble sequence and the payload. When re-transmitting, the terminal can re-select a preamble sequence, and thus the MCS, the demodulation pilot resource and etc. may be different. Meanwhile, the probability of being detected correctly can be improved by the way of increasing power and etc.

Second Embodiment

The methods for random access provided by the present disclosure will be described through specific designs of the payload in this embodiment. In present embodiment, a terminal need to transmit a small amount of service data and can transmit all the data through a single transmission. Therefore, it is not necessary to perform process for random access, and it is only necessary to transmit a small amount of data to a receiver. For example, it is only necessary to transmit a small amount of meter reading information to the receiver in services such as meter reading services in machine type communication (MTC). In such a situation, the payload mainly comprises the unique user identification information and the service data. The terminal can obtain random access configuration information set by the network by reading a system message (for example, reading MIB or SIB message from downlink PBCH), which is for example the time-frequency resource position for random access, the configuration information of the preamble sequence and etc.

It is to be noted that the random access signal transmitted by the terminal is composed of a cyclic prefix CP1 (the CP of the preamble sequence), the preamble sequence, a cyclic prefix CP2 (the cyclic prefix of the payload), the payload and a guard time (GT) as shown in FIG. 11. The length of the cyclic prefix CP1 can be configured to be same as that of the cyclic prefix CP2 for accuracy detection. The structure of the payload is shown in FIG. 11 which comprises unique user identification information (user identification or token), service data and other data.

Next, the terminal obtains the configuration information of a selectable preamble sequence and the time-frequency resource position that can be used to transmit the preamble sequence and the payload from the random access configuration information that it read. Meanwhile, the random access configuration information can indicate the following information: the resource position used to transmit the preamble sequence for random access, as well as the mapping relationship between the preamble sequence for random access and the payload. The mapping relationship indicates at least one of: the mapping relationship between the preamble sequence for random access and the position and size of a corresponding payload, the mapping relationship between the preamble sequence for random access and the MCS of a corresponding payload, the mapping relationship between the preamble sequence for random access and the DMRS that can be adopted by a corresponding payload, and even the mapping relationship between the preamble sequence for random access and the non-orthogonal multiple access resource (for example, codebook, interleaver, grid mapping pattern, codeword resource and etc.) that can be used by a corresponding payload when non-orthogonal multiple access is adopted. The above mapping relationship between the preamble sequence and the DMRS may further comprise the following situations:

1. When DMRS is used to estimate channel user data demodulation, two or more preamble sequences for random access correspond to a same payload time-frequency resource, and DMRSs of the payload corresponding to each preamble sequence for random access are orthogonal or quasi-orthogonal to each other. A DMRS can be the corresponding preamble sequence for random access itself, with the two or more preamble sequences for random access being orthogonal or quasi-orthogonal to each other. The DMRS may also be orthogonal or quasi-orthogonal reference signals corresponding to the preamble sequence for random access as indicated by the mapping relationship. In such a situation, when transmitting the preamble sequence for random access and the payload by using the corresponding transmission resource, it is further necessary to transmit orthogonal or quasi-orthogonal reference signals corresponding to the preamble sequence for random access as indicated by the mapping relationship by using the corresponding payload resource; and 2. If the channel user data demodulation is estimated by using a preamble sequence, this kind of configuration can be indicated in the configuration information on network-side and thus terminals do not provide resource for DMRS in the payload.

Furthermore, the above mapping relationship between the preamble sequence and the non-orthogonal multiple access resource can be further embodied as: one preamble sequence can correspond to two or more non-orthogonal multiple access resource. Specifically, for example, one preamble sequence can correspond to a plurality of interleavers. After the terminal selects the preamble sequence, it can find a set of usable non-orthogonal multiple access resource according to the mapping relationship and select one therefrom randomly. Alternatively, the non-orthogonal multiple access resource can be divided into groups and selected for use according to a certain rule. In addition to being selected randomly, the mapping relationship between the preamble sequence and the non-orthogonal multiple access resource can be selected according to a certain rule which can be:

1. a selection rule based on the size of the data block to be transmitted. A group of the non-orthogonal multiple access resource is selected when the data block is larger than or equal to a threshold value, and the other group of the non-orthogonal multiple access resource is selected when the data block is smaller than the threshold value; or 2. a selection rule based on demodulation pilot resource. Specifically, mapping relationships is established among a preamble sequence, a demodulation pilot and a non-orthogonal multiple access resource pool. A preamble sequence is mapped to a demodulation pilot to be used, and then the demodulation pilot to be used is mapped to a non-orthogonal multiple access resource pool to be used. Each of the mapping relationships can be a one-to-one, a one-to-multiple or a multiple-to-one mapping relationship.

Specifically, on the basis of the above mapping relationships, the terminal may be informed of predetermined mapping relationships by the network side through physical downlink broadcast channel, physical downlink shared channel or physical downlink control channel.

Specifically, reference is now made to FIG. 12 which illustrates a flowchart showing data transmission and feedback reception by the terminal in the second embodiment. In the present embodiment, after the terminal reads necessary system configuration information, the process for random access comprises the following steps of:

Step 1:

The terminal can select a corresponding preamble sequence randomly or according to size of data to be transmitted, and, at the same time, select or configure parameters for transmitting the payload according to the purpose for the present access. In the present embodiment, the terminal transmits all data to the receiver through a single transmission, and the information included in the payload comprises the unique user identification information (user identification or token) and the service data.

Furthermore, the terminal can report the index of the best beam direction in the payload if beam polling is used by network side when searching for a synchronization channel. Also, the terminal can report to the network side its ability to support a variety of digital numerology and its ability to support a variety of services.

Step 2:

The base station detects the preamble sequence in the time-frequency resource used for random access. If the transmission of a preamble sequence is detected and thus the MCS, the demodulation pilot resource (if used) and the non-orthogonal multiple access resource (if used) of a payload following the preamble sequence are known from the mapping relationship, detection and decoding can be performed on the payload. If the detection and decoding is performed correctly, information carried by the payload can be obtained, which in this embodiment is user identification or token and service data. It is necessary to transmit the feedback information according to the received information on network side, which comprises information about whether the service data is decoded correctly and/or whether enough uplink transmission time-frequency resource is provided for all buffered data to be transmitted. The feedback information may comprise:

1. ACK signal if the preamble sequence and the payload are correctly detected and decoded by the network side. In this situation, it is indicated that the whole payload is decoded correctly which implies that the service data transmitted by the terminal is detected and decoded correctly; or 2. NACK signal if the preamble sequence is correctly detected and decoded but the payload is neither detected nor decoded correctly by the network side(Alternatively, the NACK signal is transmitted directly).

Furthermore, the terminal may detect the feedback information in a fixed time window when receiving the feedback information. The starting time of the time window is calculated according to the time at which the preamble sequence for random access or the payload is transmitted. If no feedback information is successfully detected within the time window, it is determined that neither the preamble sequence for random access nor is the payload successfully received. Therefore, the preamble sequence for random access and the payload will be re-transmitted.

The terminal can learn about the following three situations from the feedback information:

1. The preamble sequence and the payload from the terminal are detected and decoded correctly, if the feedback information comprises unique user identification information (for example, terminal ID or token) and the ACK signal.

In this situation, data transmission has been completed by the terminal and it is not necessary to obtain information about uplink synchronization or uplink transmission grant.

2. The preamble sequence of the terminal is demodulated correctly while the payload is not demodulated correctly if NACK signal is detected in the feedback information. It will be possible that the preamble sequence of the terminal collides with that of other terminal, if no unique user identification information is detected in the feedback information (or the detected unique user identification information is different from that of the terminal itself). In such a situation, the terminal can back-off randomly for a time period and then re-transmit a preamble sequence and the payload. When re-transmitting, the terminal can re-select a preamble sequence (and thus the MCS, the demodulation pilot resource and etc. may be different). Meanwhile, the probability of being detected correctly can be improved by the way of increasing power and etc.

3. No feedback information is detected by the terminal, which means that the preamble sequence for random access of the terminal is not detected correctly. In such a situation, the terminal can back-off randomly for a time period and then re-transmit a preamble sequence and the payload. When re-transmitting, the terminal can re-select a preamble sequence (and thus the MCS, the demodulation pilot resource and etc. may be different). Meanwhile, the probability of being detected correctly can be improved by the way of increasing power and etc.

Third Embodiment

The methods for random access of the present disclosure have been described in a situation of RRC connection requirement and a situation of single transmission service respectively in above first and second embodiments. In particular, the structure of the payload and operation on the feedback information in different situations are described. The method for random access provided by the present disclosure will be described in a scenario of beamforming system of 5G. In the present embodiment, beam polling scheme is used for synchronizing signal (SS) such as main SS, auxiliary SS and etc. by the network side. Specifically, if it is assumed that beam can be provided in N directions by the network side, the SS will be transmitted in each of the directions, as shown in FIG. 13. By receiving the SS, not only the purpose of downlink synchronization can be achieved but also the index of the best beam direction for terminal receiving can be found. The best beam direction is the beam direction in which highest signal-to-noise ratio can be obtained by the terminal and which is the best beam direction for transmitting from the network side to a base station.

Therefore, it is necessary for the terminal to feedback the index of the best beam direction to the network side. If it is assumed that the index of the best beam direction is 7 with respect to the terminal in the third embodiment, it is necessary for the terminal to feedback beam index=7 to the network side. In the method for random access provided by the present disclosure, information of beam index=7 can be provided in the payload by the terminal. Once the terminal accesses the network successfully and the payload transmitted by the terminal is demodulated correctly on the network side, the best transmission beam direction for the terminal can be obtained. With respect to the feedback information, it can be fed back to the terminal by using the obtained best transmission beam direction.

It is to be noted that the random access signal transmitted by the terminal is composed of a cyclic prefix CP1 (the cyclic prefix of the preamble sequence), the preamble sequence, a cyclic prefix CP2 (the cyclic prefix of the payload), the payload and a GT as shown in FIG. 14. In order for detection accuracy, the length of the cyclic prefix CP1 can be configured to be same as that of the cyclic prefix CP2. The structure of the payload is shown in FIG. 14, which comprises the index of the best beam direction determined by the terminal and other information (for example, unique user identification information and etc., which may be found in other embodiments and will not be repeated herein).

Next, the terminal obtains the configuration information of a selectable preamble sequence and the time-frequency resource position that can be used to transmit the preamble sequence and the payload from the random access configuration information that it read. Meanwhile, the random access configuration information can indicate the following information: the resource position used to transmit the preamble sequence for random access, as well as the mapping relationship between the preamble sequence for random access and the payload. The mapping relationship indicates at least one of: the mapping relationship between the preamble sequence for random access and the position and size of a corresponding payload resource, the mapping relationship between the preamble sequence for random access and the MCS of a corresponding payload, the mapping relationship between the preamble sequence for random access and the DMRS that can be adopted by a corresponding payload, and even the mapping relationship between the preamble sequence for random access and the non-orthogonal multiple access resource (for example, a codebook, an interleaver, a grid mapping pattern, codeword resource and etc.) that can be used by a corresponding payload when non-orthogonal multiple access is adopted. The above mapping relationship between the preamble sequence and the DMRS may further comprise the following situations:

1. When DMRS is used to estimate channel user data demodulation, two or more preamble sequences for random access correspond to a same payload time-frequency resource, and DMRSs of the payloads corresponding to the respective preamble sequences are orthogonal or quasi-orthogonal to each other. A DMRS can be a corresponding preamble sequence for random access itself, with the two or more preamble sequences for random access being orthogonal or quasi-orthogonal to each other. The DMRSs may also be orthogonal or quasi-orthogonal reference signals corresponding to the preamble sequence for random access as indicated by the mapping relationship. In such a situation, when transmitting the preamble sequence for random access and the payload by using corresponding transmission resources, it is further necessary to transmit the orthogonal or quasi-orthogonal reference signals corresponding to the preamble sequence for random access as indicated by the mapping relationship by using corresponding payload resource; and 2. If the channel user data demodulation is estimated by using a preamble sequence, this kind of configuration information can be indicated in the configuration information on network-side and thus the terminal does not provide resource for DMRS in the payload.

The above mapping relationship between the preamble sequence and the non-orthogonal multiple access resource can be further embodied as: one preamble sequence corresponding to two or more non-orthogonal multiple access resource. Specifically, for example, one preamble sequence can correspond to a plurality of interleavers. After the terminal selects the preamble sequence, it may find a set of usable non-orthogonal multiple access resource according to the mapping relationship and select one therefrom randomly. Alternatively, the non-orthogonal multiple access resource can be divided into groups and selected for use according to a certain rule. In addition to being selected randomly, the mapping relationship between the preamble sequence and the non-orthogonal multiple access resource can be selected according to a certain rule which can be:

1. a selection rule based on the size of the data block to be transmitted. A group of the non-orthogonal multiple access resource is selected when the data block is larger than or equal to a threshold value, and the other group of the non-orthogonal multiple access resource is selected when the data block is smaller than the threshold value; or 2. a selection rule based on demodulation pilot resource. Specifically, mapping relationships are established among a preamble sequence, a demodulation pilot and a non-orthogonal multiple access resource pool. A preamble sequence is mapped to a demodulation pilot to be used, and then the demodulation pilot to be used is mapped to a non-orthogonal multiple access resource pool to be used. Each of the mapping relationships can be a one-to-one, a one-to-multiple or a multiple-to-one mapping relationship.

On the basis of the above mapping relationships, the terminal can be informed of predetermined mapping relationships by the network side through a physical downlink broadcast channel, a physical downlink shared channel or a physical downlink control channel.

Reference can be made to FIG. 15 which illustrates a flowchart showing the data transmission and the feedback reception by the terminal in the present embodiment. The process for random access in the present embodiment comprises, after the terminal reads necessary system configuration information, the steps of:

Step 1:

The terminal can select a corresponding preamble sequence randomly or according to size of data to be transmitted, and, at the same time, select or configure parameters for transmitting the payload according to the purpose for the present access. In the present embodiment, the terminal reports to the network side the index of the best beam direction that it detected through the payload. The payload must comprise information about the index of the best beam direction. Also, the terminal can report to the network side its ability to support a variety of digital numerology and its ability to support a variety of services.

Step 2:

The base station detects the preamble sequence in the time-frequency resource used for random access. If the transmission of a preamble sequence indicated as preamblel is detected and thus the MCS, the demodulation pilot resource (if used) and the non-orthogonal multiple access resource (if used) of a payload following the preamble sequence are known from the mapping relationship, detection and decoding can be performed on the payload. If the detection and decoding is performed correctly, information carried by the payload can be obtained, which in this embodiment is user identification or token and service data. It is needed to transmit the feedback information according to the received information on network side, which comprises information about whether the service data is decoded correctly and/or whether enough uplink transmission time-frequency resource is provided for all buffered data to be transmitted. The feedback information may comprise:

1. ACK signal if the preamble sequence and the payload are correctly detected and decoded on the network side. In this situation, it is indicated that the whole payload is decoded correctly, which implies that the service data transmitted by the terminal is detected and decoded correctly; or 2. NACK signal if the preamble sequence is correctly detected and decoded but the payload is not detected and decoded correctly on the network side (alternatively, NACK signal is transmitted).

Meanwhile, the feedback information is transmitted to the terminal in the best transmission beam direction obtained by decoding. If the decoding fails and no information about the best transmission beam direction is obtained, the feedback information will be transmitted through an all-directional antenna or by the way of polling.

Furthermore, the terminal may detect the feedback information in a fixed time window when receiving the feedback information. The starting time of the time window is calculated according to the time at which the preamble sequence for random access or the payload is transmitted. If no feedback information is successfully detected within the time window, it is determined that neither the preamble sequence for random access nor is the payload successfully received. Therefore the preamble sequence for random access and the payload will be re-transmitted.

The terminal can learn about the following three situations from the feedback information:

1. The preamble sequence and the payload from the terminal are detected and decoded correctly, if the feedback information comprises unique user identification information (for example, terminal ID or token) and the ACK signal.

2. The preamble sequence of the terminal is demodulated correctly while the payload is not demodulated correctly if NACK signal is detected in the feedback information. It will be possible that the preamble sequence of the terminal collides with that of other terminal, if no unique user identification information is detected in the feedback information (or the detected unique user identification information is different from that of the terminal itself). In such a situation, the terminal can back-off randomly for a time period and then re-transmit a preamble sequence and the payload. When re-transmitting, the terminal can re-select a preamble sequence (and thus the MCS, the demodulation pilot resource and etc. may be different). Meanwhile, the probability of being detected correctly can be improved by the way of increasing power and etc.

3. No feedback information is detected by the terminal, which means that the preamble sequence for random access of the terminal is not detected correctly. In such a situation, the terminal can back-off randomly for a time period and then re-transmit a preamble sequence and the payload. When re-transmitting, the terminal can re-select a preamble sequence (and thus the MCS, the demodulation pilot resource and etc. may be different). Meanwhile, the probability of being detected correctly can be improved by the way of increasing power and etc.

Fourth Embodiment

The operations of the methods for random access of the present disclosure have been described in different situations in above embodiments. However, there is only one way to combine the preamble sequence and the payload in those embodiments. In the present embodiment, a plurality of channel structures that can be used in combination with the present disclosure will be introduced by adding a cyclic postfix (CPT) and a GT.

In an embodiment of the present disclosure, a channel structure used in the method for random access comprises a cyclic prefix for a preamble sequence, the preamble sequence, a cyclic prefix for a payload and the payload in this order, as shown in FIG. 16;

In an embodiment of the present disclosure, a channel structure of the method for random access comprises a cyclic prefix for a preamble sequence, the preamble sequence, a cyclic prefix for a payload, the payload and a GT in this order, as shown in FIG. 17. It is easy to understand that the structure has been used in the above-mentioned embodiments;

In an embodiment of the present disclosure, a channel structure of the method for random access comprises a cyclic prefix for a preamble sequence, the preamble sequence, a GT, a cyclic prefix for a payload, the payload and a GT in this order, as shown in FIG. 18;

In an embodiment of the present disclosure, a channel structure of the method for random access comprises a cyclic prefix for a preamble sequence, the preamble sequence, a GT, a cyclic prefix for a payload and the payload in this order, as shown in FIG. 19;

In an embodiment of the present disclosure, a channel structure of the method for random access comprises a cyclic prefix for a preamble sequence, the preamble sequence, a cyclic postfix for the preamble sequence, a cyclic prefix for a payload and the payload in this order, as shown in FIG. 20;

In an embodiment of the present disclosure, a channel structure of the method for random access comprises a cyclic prefix for a preamble sequence, the preamble sequence, a cyclic postfix for the preamble sequence, a cyclic prefix for a payload, the payload and a GT in this order, as shown in FIG. 21;

In an embodiment of the present disclosure, a channel structure of the method for random access comprises a cyclic prefix for a preamble sequence, the preamble sequence, a cyclic postfix for the preamble sequence, a GT, a cyclic prefix for a payload, the payload and a GT in this order, as shown in FIG. 22;

In an embodiment of the present disclosure, a channel structure of the method for random access comprises a cyclic prefix for a preamble sequence, the preamble sequence, a cyclic postfix for the preamble sequence, a GT, a cyclic prefix for a payload and the payload in this order, as shown in FIG. 23;

In an embodiment of the present disclosure, a channel structure of the method for random access comprises a cyclic prefix for a preamble sequence, the preamble sequence, a cyclic prefix for a payload, the payload and a cyclic postfix for the payload in this order, as shown in FIG. 24;

In an embodiment of the present disclosure, a channel structure of the method for random access comprises a cyclic prefix for a preamble sequence, the preamble sequence, a cyclic prefix for a payload, the payload and a GT in this order, as shown in FIG. 25;

In an embodiment of the present disclosure, a channel structure of the method for random access comprises a cyclic prefix for a preamble sequence, the preamble sequence, a GT, a cyclic prefix for a payload, the payload, a cyclic postfix for the payload and a GT in this order, as shown in FIG. 26;

In an embodiment of the present disclosure, a channel structure of the method for random access comprises a cyclic prefix for a preamble sequence, the preamble sequence, a GT, a cyclic prefix for a payload, the payload and a cyclic postfix for the payload in this order, as shown in FIG. 27;

In an embodiment of the present disclosure, a channel structure of the method for random access comprises a cyclic prefix for a preamble sequence, the preamble sequence, a cyclic postfix for the preamble sequence, a cyclic prefix for a payload, the payload and a GT in this order, as shown in FIG. 28;

In an embodiment of the present disclosure, a channel structure of the method for random access comprises a cyclic prefix for a preamble sequence, the preamble sequence, a cyclic postfix for the preamble sequence, a cyclic prefix for a payload, the payload and a GT in this order, as shown in FIG. 29

In an embodiment of the present disclosure, a channel structure of the method for random access comprises a cyclic prefix for a preamble sequence, the preamble sequence, a cyclic postfix for the preamble sequence, a GT, a cyclic prefix for a payload, the payload, a cyclic postfix for the payload and a GT in this order, as shown in FIG. 30;

In an embodiment of the present disclosure, a channel structure of the method for random access comprises a cyclic prefix for a preamble sequence, the preamble sequence, a cyclic postfix for the preamble sequence, a GT, a cyclic prefix for a payload, the payload and a cyclic postfix for the payload in this order, as shown in FIG. 31.

It can be easily understood that all the above-mentioned 16 channel structures can be used in conjunction with the method for random access of the present disclosure. By adding the cyclic prefix and the cyclic postfix, the detection and decoding of the preamble sequence and the payload can be facilitated, that is, inter-carrier interference and intersymbol interference can be resisted easily. By adding the GT, it is possible to alleviate possible interference on signals from the terminal.

The structure of the payload and the steps for random access (including the steps of transmitting a signal for random access and receiving the feedback information from the network side by the terminal) have been described in above embodiments and will not be repeated herein.

In summary, the fact that the method for random access in the prior art comprises four interactive steps makes it limited when facing new services and requirements in 5G and causes a problem of very large control signaling overhead. Therefore, in order to overcome the problem, a method for random access has been proposed in an embodiment of the present disclosure, which comprises steps of transmitting a random access signal comprising a preamble sequence and a payload from a terminal to a base station and receiving feedback information transmitted back from the base station by the terminal. The preamble sequence is configured randomly or according to size of data to be transmitted. The payload is configured according to current service requirements. The feedback information comprises at least one of unique user identification information, TA information, uplink transmission grant information, and ACK signal/NACK signal. The present technical solution may use 2 interactive steps to realize the function that is realized through 4 interactive steps in the prior art by designing the random access signal such that it comprises the preamble sequence and the payload, therefore it can be adapted to new requirements in 5G and reduce access delay in a single data transmission.

Fifth Embodiment

The present disclosure further provides a device for random access based on the above- mentioned method for random access according to modularization of computer software. The device can be a terminal comprising a signal transmitting module 3201 and a feedback receiving module 3202 as shown in FIG. 32.

The signal transmitting module 3201 is used to transmit a random access signal comprising a preamble sequence and a payload from a terminal to a base station. The preamble sequence is configured randomly or according to size of data to be transmitted and the payload is configured according to current service requirements. The feedback receiving module 3202 is used to receive by the terminal feedback information transmitted back by the base station which corresponds to the random access signal. The feedback information comprises at least one of unique user identification information, timing advance information, uplink transmission grant information, and ACK signal/NACK signal.

The functions of the modules of the device for random access provided in the technical solution of the present embodiment can be achieved by reference to the above-mentioned step 701 and step 702 as well as the first to fourth embodiments, which will not be repeated herein.

Sixth Embodiment

The present disclosure further provides a device for random access based on the above-mentioned method for random access of another embodiment according to modularization of computer software. For example, the device can be a terminal comprising a signal receiving module 3301 and a feedback module 3302 as shown in FIG. 33.

The signal receiving module 3301 is used to receive and demodulate a random access signal transmitted from a terminal by a base station. The random access signal comprises a preamble sequence and a payload. The feedback module 3302 is used to transmit corresponding feedback information to the terminal by the base station according to a reception result of the random access signal. The feedback information comprises at least one of unique user identification information, timing advance information, uplink transmission grant information, and ACK signal/ NACK signal.

The functions of the modules of the device for random access provided in the technical solution of the present embodiment can be achieved by reference to the above-mentioned step 801 and step 802 as well as the first to fourth embodiments, which will not be repeated herein.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a terminal in a wireless communication system, the method comprising:
    receiving, from a base station (BS), at least one synchronization signal associated with at least one transmission beam of the BS;
    receiving, from the BS, configuration information for an initial access including information on a mapping between a preamble and resource for a payload;
    transmitting, to the BS, a random access signal based on the configuration information, the random access signal including the preamble and the payload; and
    receiving, from the base station, feedback information as a response to the random access signal,
    wherein the payload is associated with a transmission beam direction of a synchronization signal among the at least one synchronization signal.

2. The method of claim 1, wherein the configuration information further includes resource information on the payload.

3. The method of claim 2, wherein the configuration information further includes information on a preamble sequence,
    wherein the preamble sequence is configured randomly or according to a size of data to be transmitted and the payload is configured according to current service requirements, and
    wherein the feedback information comprises at least one of unique user identification information, timing advance information, uplink transmission grant information, and acknowledgement (ACK) signal/negative acknowledgement (NACK) signal.

4. The method of claim 3, following the receiving the feedback information from the base station which corresponds to the random access signal, further comprising:
transmitting the payload and an updated preamble sequence from the terminal to the base station when the feedback information comprises the NACK signal.

5. The method of claim 3, the transmitting the random access signal comprising the preamble sequence and the payload to the base station is re-performed when no feedback information is received from the base station.

6. The method of claim 3, wherein one of:
the payload comprises unique user identification information and the payload further comprises at least one of a radio resource control connection request carrying a predetermined amount of data and a buffer status report when a service requirement is to transmit the radio resource control connection request,
the payload comprises unique user identification information and the payload further comprises at least service data when the terminal transmits the random access signal in a single transmission service, or
the payload comprises at least a beam direction index when the terminal transmits the beam direction index to the base station.

7. The method of claim 1, wherein the configuration information further includes information on a configuration of demodulation reference signal (DMRS) for the payload.

8. The method of claim 1, wherein the configuration information further includes information on a modulation and coding scheme (MCS) of the payload.

9. The method of claim 1, wherein the configuration information further includes information on a preamble sequence.

10. The method of claim 1, wherein, in case that the feedback information indicates a negative acknowledgement (NACK), the feedback information includes an uplink grant.

11. A method performed by a base station (BS) in a wireless communication system, the method comprising:
transmitting, to a terminal, at least one synchronization signal associated with at least one transmission beam of the BS;
transmitting, to the terminal, configuration information for an initial access including information on a mapping between a preamble and resource for a payload;
receiving a random access signal from a terminal, the random access signal including the preamble and the payload; and
transmitting, to the terminal, feedback information in response to the random access signal,
wherein the payload is associated with a transmission beam direction of a synchronization signal among the at least one synchronization signal.

12. The method of claim 11, wherein the transmitting the feedback information to the terminal corresponding to the random access signal comprises:
transmitting the feedback information to the terminal according to a demodulation result of the random access signal.

13. The method of claim 11, wherein the configuration information further includes resource information on the payload.

14. The method of claim 11, wherein a relationship between the preamble and the payload is configured randomly or according to a certain rule, and the relationship is a one-to-one, a one-to-multiple or a multiple-to-one relationship.

15. The method of claim 11, wherein the configuration information further includes information on a configuration of demodulation reference signal (DMRS) for the payload.

16. The method of claim 11, wherein the configuration information further includes information on a modulation and coding scheme (MCS) of the payload.

17. The method of claim 11, wherein the configuration information further includes information on a preamble sequence.

18. A terminal in a wireless communication system, the terminal comprising:
a transceiver configured to transmit and receive signals; and
at least one processor operably coupled to the transceiver, and configured to:
receive, from a base station (BS), at least one synchronization signal associated with at least one transmission beam of the BS,
receive, from the BS, configuration information for an initial access including information on a mapping between a preamble and resource for a payload,
transmit, to the BS, a random access signal, the random access signal including the preamble and the payload based on the configuration information, and
receive, from the BS, feedback information as a response to the random access signal,
wherein the payload is associated with a transmission beam direction of a synchronization signal among the at least one synchronization signal.

19. The terminal of claim 18, wherein the configuration information further includes resource information on the payload.

20. The terminal of claim 18, wherein the configuration information further includes information on a preamble sequence,
wherein the preamble sequence is configured randomly or according to a size of data to be transmitted and the payload is configured according to current service requirements, and
wherein the feedback information comprises at least one of unique user identification information, timing advance information, uplink transmission grant information, and acknowledgement (ACK) signal/negative acknowledgement (NACK) signal.

21. The terminal of claim 20, wherein the at least one processor is further configured to:
following the receiving the feedback information from the BS which corresponds to the random access signal, control the transceiver to transmit the payload and an updated preamble sequence from the terminal to the base station when the feedback information comprises the NACK signal.

22. The terminal of claim 20, wherein the at least one processor is further configured to:
control the transceiver to re-transmit the random access signal comprising the preamble sequence and the payload to the base station when no feedback information is received from the base station.

23. The terminal of claim 18, wherein the configuration information further includes information on a configuration of demodulation reference signal (DMRS) for the payload.

24. The terminal of claim 18, wherein the configuration information further includes information on a modulation and coding scheme (MCS) of the payload.

25. The terminal of claim 18, wherein the configuration information further includes information on a preamble sequence.

26. A base station (BS) in a wireless communication system, the BS comprising:
- a transceiver; and
- at least one processor operably coupled to the transceiver, and configured to:
    - transmit, to a terminal, at least one synchronization signal associated with at least one transmission beam of the BS,
    - transmit, to a terminal, configuration information for an initial access including information on a mapping between a preamble and resource for a payload,
    - receive, a random access signal from a terminal, the random access signal including the preamble and the payload, and
    - transmit, to the terminal, feedback information in response to the random access signal,
- wherein the payload is associated with a transmission beam direction of a synchronization signal among the at least one synchronization signal.

27. The BS of claim 26, wherein the at least one processor further configured to:
- transmit the feedback information to the terminal according to a demodulation result of the random access signal.

28. The BS of claim 26, wherein the configuration information further includes resource information on the payload.

29. The BS of claim 26, wherein a relationship between the preamble and the payload is configured randomly or according to a certain rule, and the relationship is a one-to-one, a one-to-multiple or a multiple-to-one relationship.

* * * * *